US010251114B2

(12) United States Patent
Tinnakornsrisuphap et al.

(10) Patent No.: US 10,251,114 B2
(45) Date of Patent: Apr. 2, 2019

(54) LOCAL IP ACCESS SCHEME

(71) Applicant: QUALCOMM Incorporated, San Diego, CA (US)

(72) Inventors: Peerapol Tinnakornsrisuphap, San Diego, CA (US); Fatih Ulupinar, San Diego, CA (US); John Nasielski, San Diego, CA (US); Jun Wang, Poway, CA (US); Parag Agashe, San Diego, CA (US); Rajarshi Gupta, Sunnyvale, CA (US); Ramin Rezaiifar, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 14/468,150

(22) Filed: Aug. 25, 2014

(65) Prior Publication Data

US 2014/0362773 A1 Dec. 11, 2014

Related U.S. Application Data

(62) Division of application No. 12/427,178, filed on Apr. 21, 2009, now Pat. No. 8,856,387.

(Continued)

(51) Int. Cl.
*H04W 40/02* (2009.01)
*H04L 12/28* (2006.01)
(Continued)

(52) U.S. Cl.
CPC ......... *H04W 40/02* (2013.01); *H04L 12/2889* (2013.01); *H04L 29/12952* (2013.01);
(Continued)

(58) Field of Classification Search
CPC ........... H04L 12/2889; H04L 29/12028; H04L 29/12952; H04L 61/103; H04L 61/6077;
(Continued)

(56) References Cited

U.S. PATENT DOCUMENTS 6,535,493 B1 * 3/2003 Lee .................. H04W 8/02
370/329
6,591,306 B1 * 7/2003 Redlich ............. H04L 29/12018
370/401

(Continued)

FOREIGN PATENT DOCUMENTS

CN 1706166 A 12/2005
EP 2037639 A2 3/2009
(Continued)

OTHER PUBLICATIONS

3GPP; Technical Specification Group Services and System Aspects; System enhancements for the use of IMS services in local breakout and optimal routing of media, Release 8, 3GPP TR 23.894 V0.3.1 (Jan. 2008).

(Continued)

Primary Examiner — Dung B Huynh
(74) Attorney, Agent, or Firm — Austin Rapp; QUALCOMM Incorporated

(57) ABSTRACT

Local IP access is provided in a wireless network to facilitate access to one or more local services. In some implementations, different IP interfaces are used for accessing different services (e.g., local services and operator network services). A list that maps packet destinations to IP interfaces may be employed to determine which IP interface is to be used for sending a given packet. In some implementations an access point provides a proxy function (e.g., a proxy ARP function) for an access terminal. In some implementations an access point provides an agent function (e.g., a DHCP function) for an access terminal. NAT operations may be performed at an (Continued)

US 10,251,114 B2
Page 2 access point to enable the access terminal to access local services. In some aspects, an access point may determine whether to send a packet from an access terminal via a protocol tunnel based on the destination of the packet.

24 Claims, 18 Drawing Sheets

Related U.S. Application Data

(60) Provisional application No. 61/047,700, filed on Apr. 24, 2008.

(51) Int. Cl.
| | | |
|---|---|---|
| H04L 29/12 | (2006.01) | |
| H04W 48/18 | (2009.01) | |
| H04L 12/749 | (2013.01) | |
| H04L 12/46 | (2006.01) | |
| H04W 8/08 | (2009.01) | |
| H04W 80/04 | (2009.01) | |
| H04W 84/04 | (2009.01) | |
| H04W 88/08 | (2009.01) | |

(52) U.S. Cl.
CPC .......... H04L 45/741 (2013.01); H04L 61/103 (2013.01); H04L 61/6077 (2013.01); H04W 48/18 (2013.01); H04L 12/4641 (2013.01); H04L 29/12028 (2013.01); H04L 61/2061 (2013.01); H04W 8/082 (2013.01); H04W 80/04 (2013.01); H04W 84/045 (2013.01); H04W 88/08 (2013.01)

(58) Field of Classification Search
CPC ............... H04L 45/741; H04L 12/2856; H04L 12/4641; H04L 29/12264; H04L 29/12283; H04L 29/12311; H04L 29/12424; H04L 29/12783; H04L 61/2046; H04L 61/2061; H04L 61/2084; H04L 61/2535; H04L 61/35; H04W 40/02; H04W 48/18; H04W 80/04; H04W 84/045; H04W 88/08
See application file for complete search history.

(56) References Cited

U.S. PATENT DOCUMENTS

| | | | | |
|---|---|---|---|---|
| 7,095,746 | B1* | 8/2006 | Frei | H04L 61/103 370/389 |
| 7,127,524 | B1 | 10/2006 | Renda et al. | |
| 7,194,004 | B1* | 3/2007 | Thomsen | H04L 63/101 370/401 |
| 7,230,951 | B2 | 6/2007 | Mizell et al. | |
| 7,339,931 | B2 | 3/2008 | Takihiro et al. | |
| 7,506,036 | B1* | 3/2009 | Cook | H04L 1/1829 709/220 |
| 8,355,413 | B2 | 1/2013 | Vasamsetti | |
| 8,576,846 | B2 | 11/2013 | Kumar | |
| 2001/0036164 | A1* | 11/2001 | Kakemizu | H04W 8/12 370/331 |
| 2002/0035624 | A1* | 3/2002 | Kim | H04L 29/12066 709/222 |
| 2002/0111998 | A1* | 8/2002 | Kim | H04L 29/12009 709/203 |
| 2002/0116523 | A1* | 8/2002 | Warrier | H04L 29/12009 709/238 |
| 2002/0186698 | A1* | 12/2002 | Ceniza | H04L 12/4641 370/401 |
| 2003/0039248 | A1* | 2/2003 | Weaver | H04L 12/6418 370/392 |
| 2003/0108036 | A1* | 6/2003 | Henry | H04L 45/00 370/356 |
| 2003/0172184 | A1* | 9/2003 | Kong | H04L 12/4641 709/245 |
| 2003/0185233 | A1 | 10/2003 | Ji et al. | |
| 2003/0196107 | A1* | 10/2003 | Robertson | H04L 63/0815 726/7 |
| 2003/0214955 | A1* | 11/2003 | Kim | H04L 12/4633 370/400 |
| 2003/0227930 | A1* | 12/2003 | Choi | H04L 12/2856 370/401 |
| 2003/0233454 | A1* | 12/2003 | Alkhatib | H04L 29/12066 709/226 |
| 2004/0003292 | A1* | 1/2004 | Kato | H04L 29/12028 726/28 |
| 2004/0062243 | A1* | 4/2004 | Zhang | H04L 29/12009 370/392 |
| 2004/0120279 | A1 | 6/2004 | Huckins | |
| 2004/0218611 | A1* | 11/2004 | Kim | H04L 12/4633 370/401 |
| 2005/0125692 | A1* | 6/2005 | Cox | H04L 63/0272 726/4 |
| 2005/0188092 | A1* | 8/2005 | Short | H04L 29/06 709/227 |
| 2006/0031436 | A1 | 2/2006 | Sakata et al. | |
| 2006/0050671 | A1* | 3/2006 | Kim | H04L 63/08 370/338 |
| 2006/0153211 | A1* | 7/2006 | Fujino | H04L 29/12264 370/401 |
| 2006/0187914 | A1* | 8/2006 | Gumaste | H04L 61/106 370/389 |
| 2007/0019631 | A1* | 1/2007 | Jang | H04L 29/06027 370/352 |
| 2007/0140271 | A1* | 6/2007 | Amante | H04L 45/00 370/401 |
| 2007/0286142 | A1 | 12/2007 | Prakash et al. | |
| 2008/0059275 | A1* | 3/2008 | Keany | G06F 9/5027 718/102 |
| 2009/0059822 | A1* | 3/2009 | Morrill | H04L 41/0806 370/310 |
| 2009/0156213 | A1* | 6/2009 | Spinelli | H04W 92/02 455/436 |
| 2009/0164547 | A1* | 6/2009 | Ch'ng | H04W 48/08 709/201 |
| 2009/0241181 | A1 | 9/2009 | Pashalidis | |
| 2009/0268668 | A1 | 10/2009 | Tinnakornsrisuphap et al. | |

FOREIGN PATENT DOCUMENTS

| | | |
|---|---|---|
| JP | 2002084317 A | 3/2002 |
| JP | 2003333080 A | 11/2003 |
| JP | 2004129079 A | 4/2004 |
| JP | 2009521143 A | 5/2009 |
| JP | 2010503251 A | 1/2010 |
| WO | WO-0051290 A2 | 8/2000 |
| WO | WO-0191374 A1 | 11/2001 |
| WO | 2007044597 A2 | 4/2007 |
| WO | WO-07073773 | 7/2007 |
| WO | 2008011420 A1 | 1/2008 |
| WO | WO-2008022902 A1 | 2/2008 |
| WO | 2008029213 A2 | 3/2008 |
| WO | WO-2009024182 A1 | 2/2009 |

OTHER PUBLICATIONS

European Search Report—EP13192450—Search Authority—Berlin—Jan. 24, 2014.
Hinden Nokia S Deering Cisco Systems R: "Internet Protocol Version 6 (IPv6) Addressing Architecture; rfc3513.txt" IETF Standard, Internet Engineering Task Force, IETF, CH, Apr. 1, 2003 (Apr. 1, 2003), XP015009295 ISSN: 0000-0003 abstract paragraphs [02.1], [02.4], [02.5], [2.5.6], [02.8].
International Search Report and Written Opinion—PCT/US2009/041451, International Search Authority—European Patent Office—Oct. 2, 2009.

(56) References Cited

OTHER PUBLICATIONS

Nortel., et al., "Alternative Solution for Local Breakout for IMS," 3GPP Draft; 3rd Generation Partnership Project; S2-080996 WAS 858 WAS 580 LBO for IMS Final, Mobile Competence Centre 650, Route Des Lucioles; F-06921 Sophia—Antipolis Cedex; France, Jan. 22, 2008, vol. SA WG2. No. Marina del Rey, XP050263402, 7 Pages.

Perkins C., et al., "IP Mobility Support for IPv4—rfc3344.txt" IETF'Standard Internet Engineering Task Force, IETF, CH, Aug. 1, 2002 (Aug. 1, 2002), XP015009105 ISSN: 0000-0003 abstract paragraphs [01.5], [01.6], [3.6.1.1].

Qualcomm Europe: "Local IP access baseline solution for EHNB" 3GPP Draft; S2-092308, 3rd Generation Partnership Project (3GPP), Mobile Competence Centre ; 650, Route Des Lucioles ; F-06921 Sophia-Antipolis Cedex ; France, no. Hangzhou; 20090324, Mar. 24, 2009 (Mar. 24, 2009), XP050345597 [retrieved on Mar. 24, 2009] the whole document.

Taiwan Search Report—TW098113763—TIPO—Aug. 3, 2012.
Taiwan Search Report—TW098113763—TIPO—Jul. 22, 2013.
Zhao X et al: "Flexible Network Support for Mobile Hosts" Mobile Networks and Applications, ACM, New York, NY, US, vol. 6, No. 2, Mar. 1, 2001 (Mar. 1, 2001), pp. 137-149, XP001185779 ISSN: 1383-469X abstract paragraphs [03.3], [04.2], [04.3], [0005], [06.1], [6.2.1].

Zhao X et al: "Flexible Network Support for Mobility" Mobicom '98. Proceedings of the 4th Annual ACM/IEEE International Conference on Mobile Computing and Networking. Dallas,TX, Oct. 25-30, 1998; [Annual ACM/IEEE International Conference on Mobile Computing and Networking], New York, NY : ACM, US, Oct. 25, 1998 (Oct. 25, 1998), pp. 145-156, XP000850264 ISBN: 978-1-58113-035-5 abstract paragraphs [0001], [0003], [03.1], [04.2].

European Search Report—EP18208657—Search Authority—Berlin—dated Jan. 3, 2019.

\* cited by examiner

US 10,251,114 B2

LOCAL IP ACCESS SCHEME

CLAIM OF PRIORITY

This application is a divisional application of U.S. patent application Ser. No. 12/427,178, entitled, "LOCAL IP ACCESS SCHEME," filed Apr. 21, 2009, which claimed the benefit of and priority to commonly owned U.S. Provisional Patent Application No. 61/047,700, filed Apr. 24, 2008. The entireties of the aforementioned applications are hereby incorporated by reference herein.

BACKGROUND

Field

This application relates generally to wireless communication and more specifically, but not exclusively, to enabling local access.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, femto access points, or femto cells. Typically, such small-coverage base stations are connected to the Internet and the mobile operator's network via a DSL router or a cable modem.

In some cases, one or more local services may be deployed at the same location as a small-coverage base station. For example, a user may have a home network that supports a local computer, a local printer, a server, and other components. In such cases, it may be desirable to provide access to these local services via the small-coverage base station. For example, a user may wish to use his or her cell phone to access a local printer when the user is at home. Accordingly, a need exists for efficient and effective methods for accessing local services.

SUMMARY

A summary of sample aspects of the disclosure follows. It should be understood that any reference to the term aspects herein may refer to one or more aspects of the disclosure.

The disclosure relates in some aspects to facilitating access to local services and operator network services. For example, local IP access (also known as local breakout) may be used to enable an access terminal to access one or more local services when the access terminal is served by a given access point. In addition, access to an operator network may be provided for the access terminal at this access point.

The disclosure relates in some aspects to using different Internet Protocol ("IP") interfaces for different services. For example, an access terminal may use one IP interface to access local services and use another IP interface to access operator network services.

The disclosure relates in some aspect to providing a list that maps packet destinations to IP interfaces. An access terminal may use the list to determine which IP interface is to be used for sending a given packet. In some aspects, such a list may be provided by a serving access point for the access terminal.

The disclosure relates in some aspects to an access point that acts as a proxy for an access terminal. For example, the access point may intercept packets sent to the local IP address assigned to the access terminal. In some cases the access point routes the intercepted packets to the access terminal. In some cases the access point performs a proxy address resolution protocol ("ARP") function on behalf of the access terminal. For example, the access point may intercept ARP messages directed to the local network IP address that is assigned to the access terminal and respond to the message with the MAC address of the access point.

The disclosure relates in some aspects to an access point that provides an agent function to obtain a local IP address and assign the local IP address to an access terminal. For example, the access point may acquire a local network IP address for the access terminal to enable the access terminal to access local services. In some implementations this agent function comprises a dynamic host control protocol ("DHCP") function.

The disclosure relates in some aspects to performing network address translation ("NAT") at an access point. For example, the access point may convert an operator network (e.g., public) source IP address for a packet sent by an access terminal to a local (e.g., private) source IP address to enable the access terminal to access local services.

The disclosure relates in some aspects to an access point that determines whether to send a packet from an access terminal via a protocol tunnel based on the destination of the packet. For example, the access point may send packets destined for nodes that are accessible via an operator network via the protocol tunnel and send other packets to local nodes (e.g., via a local network). For a packet sent to a local node, in some implementations the access point may provide a proxy function whereby the access point substitutes a local IP address obtained on behalf of the access terminal for the packet source address. In some implementations the access point may provide a reverse NAT function whereby the access point substitutes its local IP address and an assigned port number for the packet source address.

BRIEF DESCRIPTION OF THE DRAWINGS

These and other sample aspects of the disclosure will be described in the detailed description and the appended claims that follow, and in the accompanying drawings, wherein:

Figure 1:
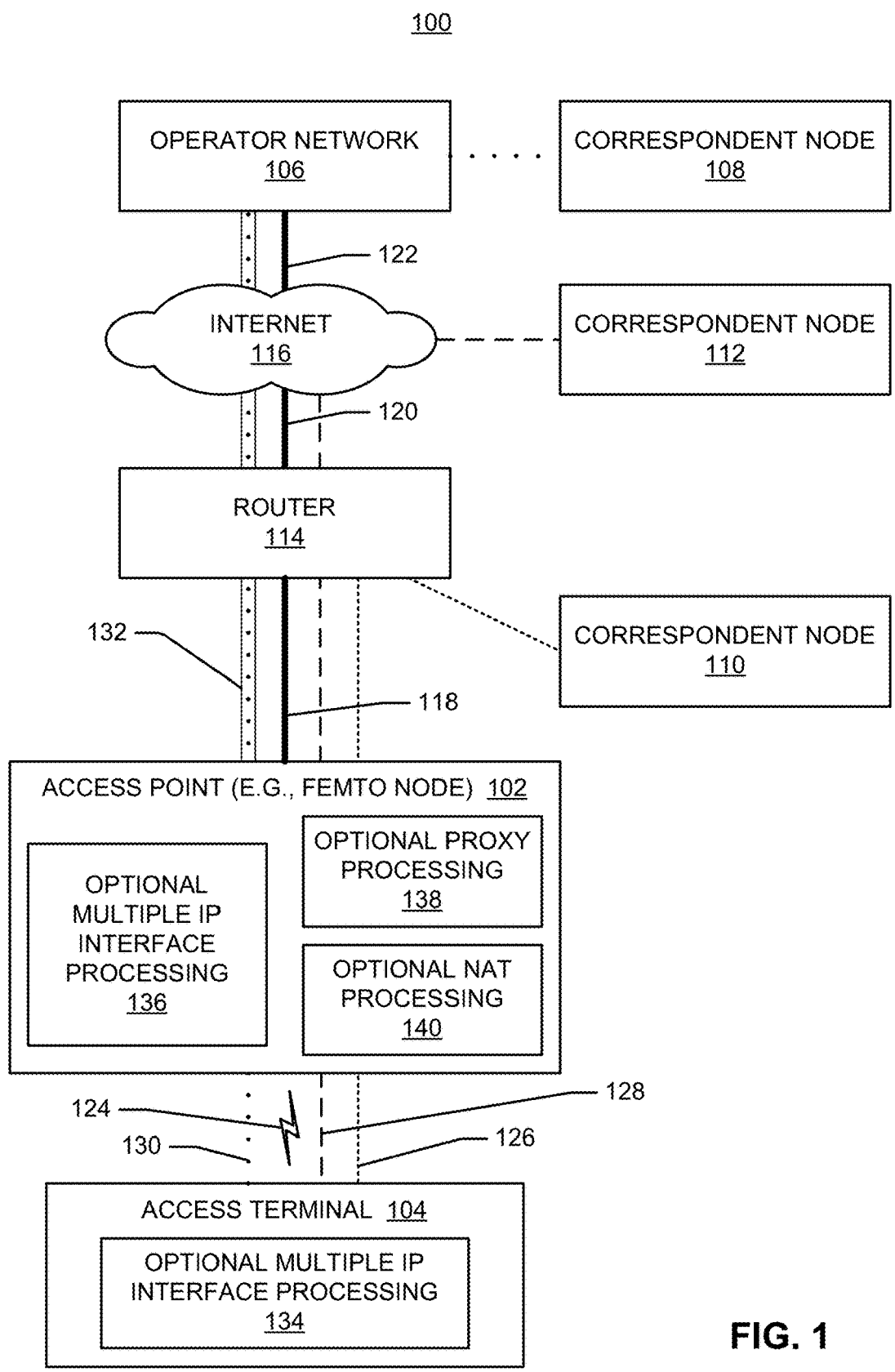
FIG. 1 is a simplified block diagram of several sample aspects of a communication system configured to support local IP access.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, routers, and network nodes that communicate with one another. It should be appreciated, however, that the teachings herein may be applicable to other types of apparatuses or other similar apparatuses that are referenced using other terminology. For example, in various implementations access points may be referred to or implemented as base stations, access terminals may be referred to or implemented as user equipment, and so on.

The system 100 includes access points that provide one or more services (e.g., network connectivity) for one or more access terminals that may reside within or that may pass through the coverage area of the access points. To reduce the complexity of FIG. 1, only a single access point 102 and a single access terminal 104 are shown. Each of the access points in the system 100 may communicate with one or more core network nodes (e.g., as represented by an operator network 106) to facilitate wide area network connectivity. Network nodes may take various forms such as, for example, one or more radio and/or core network entities (e.g., mobility management entities, session reference network controllers, gateways, routers, or some other suitable network entity or entities).

The nodes in the system 100 may employ various means to communicate with one another. In the example of FIG. 1, the access point 102 may connect to a router 114 as represented by a communication link 118, the router 114 may connect to the Internet 116 as represented by a communication link 120, and the operator network 106 may connect to the Internet 116 as represented by a communication link 122. In addition, as represented by an RF symbol 124, the access terminal 104 communicates with the access point 102 via an air interface.

Through the use of these communication links, the access terminal 104 may communicate with various correspondent nodes (e.g., nodes 108, 110, and 112) in the system 100. In some aspects, these different correspondent nodes may correspond to different levels of service.

For example, a first level of service may relate to a service accessed via an operator network. That is, the first level of service may enable an access terminal to access services similar to when the access terminal is connected to a macro network (e.g., connected to a macro base station on a wireless operator's network).

In addition, a second level of service may relate to a local service that is accessed without going through the operator network. For example, the second level of service may enable an access terminal to access certain services when the access terminal is at a home network or some other local area network. Advantageously, by bypassing the operator network, latency may be improved and resources on the operator network may be conserved (e.g., by off-loading traffic from the operator's backhaul).

Local service may take various forms. In some implementations local service may relate to services provided by entities on a local network. For example, the correspondent node 110 may represent a local server that resides on the same IP subnetwork as the access point 102 (e.g., a local area network served by the router 114). In this case, accessing a local network service may involve accessing a local printer, a local server, a local computer, another access terminal, or some other entity on the IP subnetwork. In FIG. 1, traffic (e.g., packet) flow between the access terminal 104 and the correspondent node 110 is represented by dashed line 126. The line 126 illustrates that the access terminal 104 may access this local service via the access point 102 and the router 114 (i.e., via links 124 and 118) without going through the operator network 106.

In some implementations a local service may relate to a node that is connected to some other network (e.g., correspondent node 112 connected to the Internet 116). For example, the router 114 may provide an Internet connection to an Internet service provider ("ISP") and the access terminal 104 may use this Internet connection to access service provided by the node 112 (e.g., a web server). Accordingly, through the use of local IP access, different access terminals in a network may be provided with Internet access at certain locations (e.g., a user's home, an employer's facility, an Internet hotspot, etc.) in the network. Traffic flow between the access terminal 104 and the correspondent node 112 (e.g., via links 124, 118, and 120) is represented by dashed line 128 in FIG. 1.

In the example of FIG. 1, access to correspondent node 108 (e.g., another access terminal) may be defined as a non-local service since this node is accessed via the operator network 106. Traffic flow between the access terminal 104 and the correspondent node 108 (e.g., via links 124, 118, 120, and 122) is represented by dotted line 130. Typically this traffic is routed between the access point 102 and the operator network 106 (e.g., an IP gateway for the access terminal 104 in the operator network 106) via a protocol tunnel (e.g., an IPsec tunnel) as represented by a pair of lines 132.

In various implementations, the nodes in the system 100 may facilitate local IP access through the use of multiple IP interfaces, by providing proxy functionality (e.g., a proxy ARP function) for a local network, and by providing NAT functionality for a local network. For example, in some implementations the access terminal 104 and the access point 102 may include multiple IP interface processing functionality 134 and 136, respectively, that enable the access terminal 104 to use different IP interfaces for accessing different services (e.g., different levels of service). Here, the access terminal 104 may use a first IP interface for accessing operator network services and use a second IP interface for accessing local services. In some aspects, the use of these different IP interfaces enables the access point 102 to efficiently route packets to the appropriate destination. For example, the access point 102 may be configured to automatically route any packets that were sent via a first interface to the operator network via the protocol tunnel. Conversely, the access point 102 may be configured to automatically route any packets that were sent via a second interface to a local destination.

In some implementations the access point 102 may include proxy processing functionality 138 that performs proxy operations (e.g., proxy ARP operations) on behalf of the access terminal 104. For example, the access point 102 may obtain a local network IP address for the access terminal 104 and intercept packets directed to the access terminal (e.g., packets having the access terminal's local network IP address as the destination address). In some cases the access point may forward these intercepted packets to the access terminal. In cases where the intercepted packet comprises an ARP message directed to that local IP address, the access point 102 may respond to the ARP message with the MAC address of the access point 102. In this way, another node on the local network may initiate an access to the access terminal 104 (i.e., without requiring that the access terminal first contact the other node).

In some implementations the access point 102 may include NAT processing functionality 140 that selectively performs NAT operations on packets from the access terminal 104. For example, the access point 102 may be configured to substitute a local network IP source address for an operator assigned IP source address when the access terminal sends a packet in conjunction with accessing a local service.

Figure 8A:
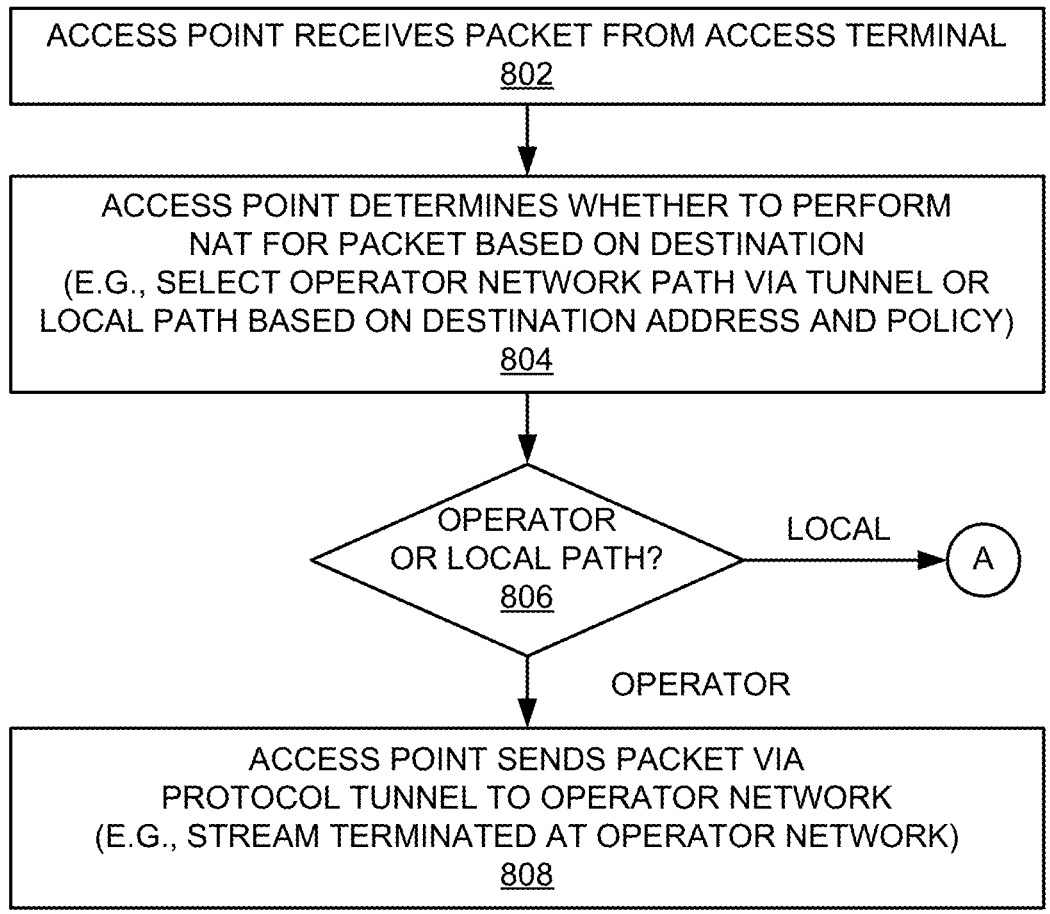
FIGS. 8A and 8B are a flowchart of several sample aspects of operations that may be performed in conjunction with an access terminal sending a packet when NAT functionality is provided in an access point.
Figure 8B:
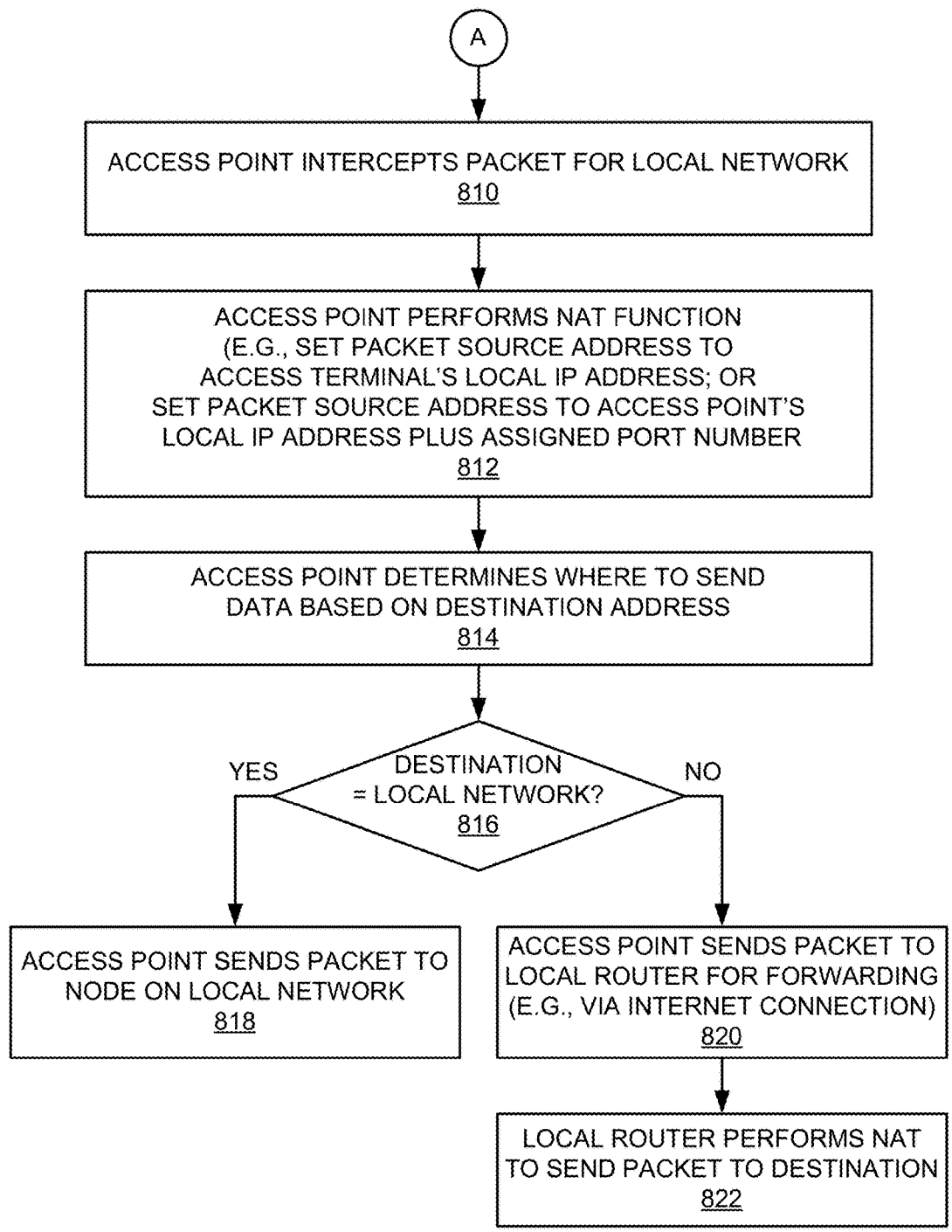
Figure 9:
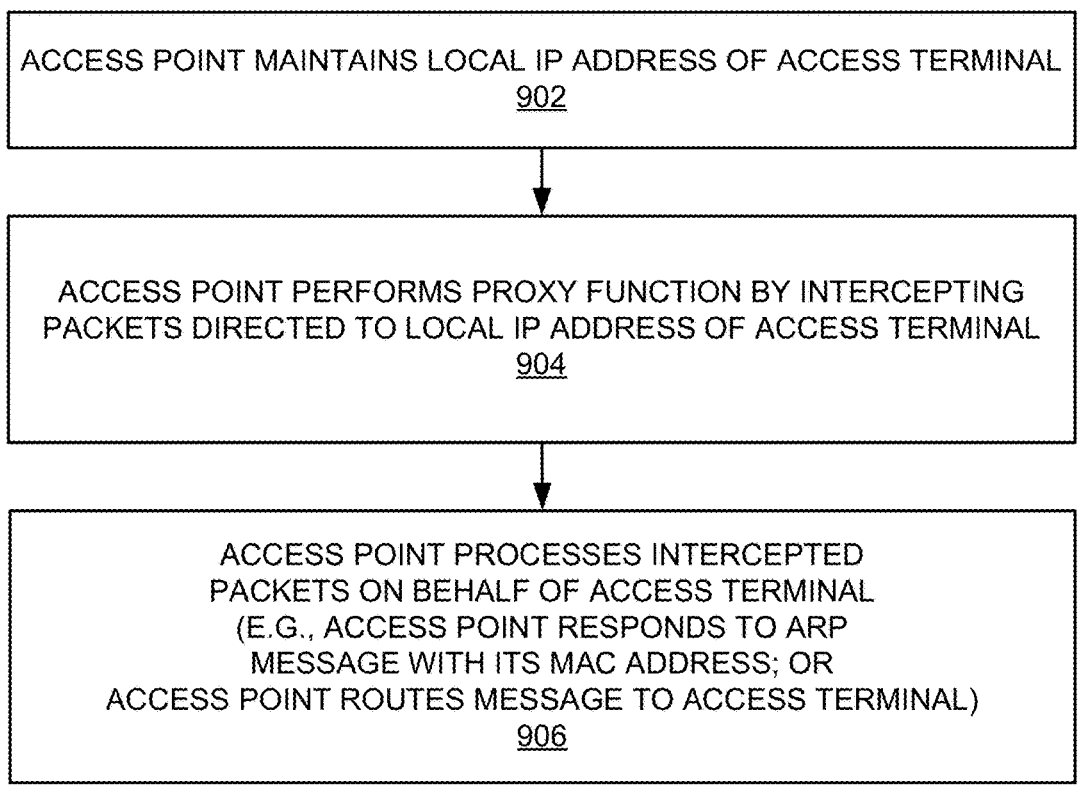
FIG. 9 is a flowchart of several sample aspects of operations that may be performed in conjunction with a proxy function that handles packets sent to an access terminal by local nodes.
Figure 10:
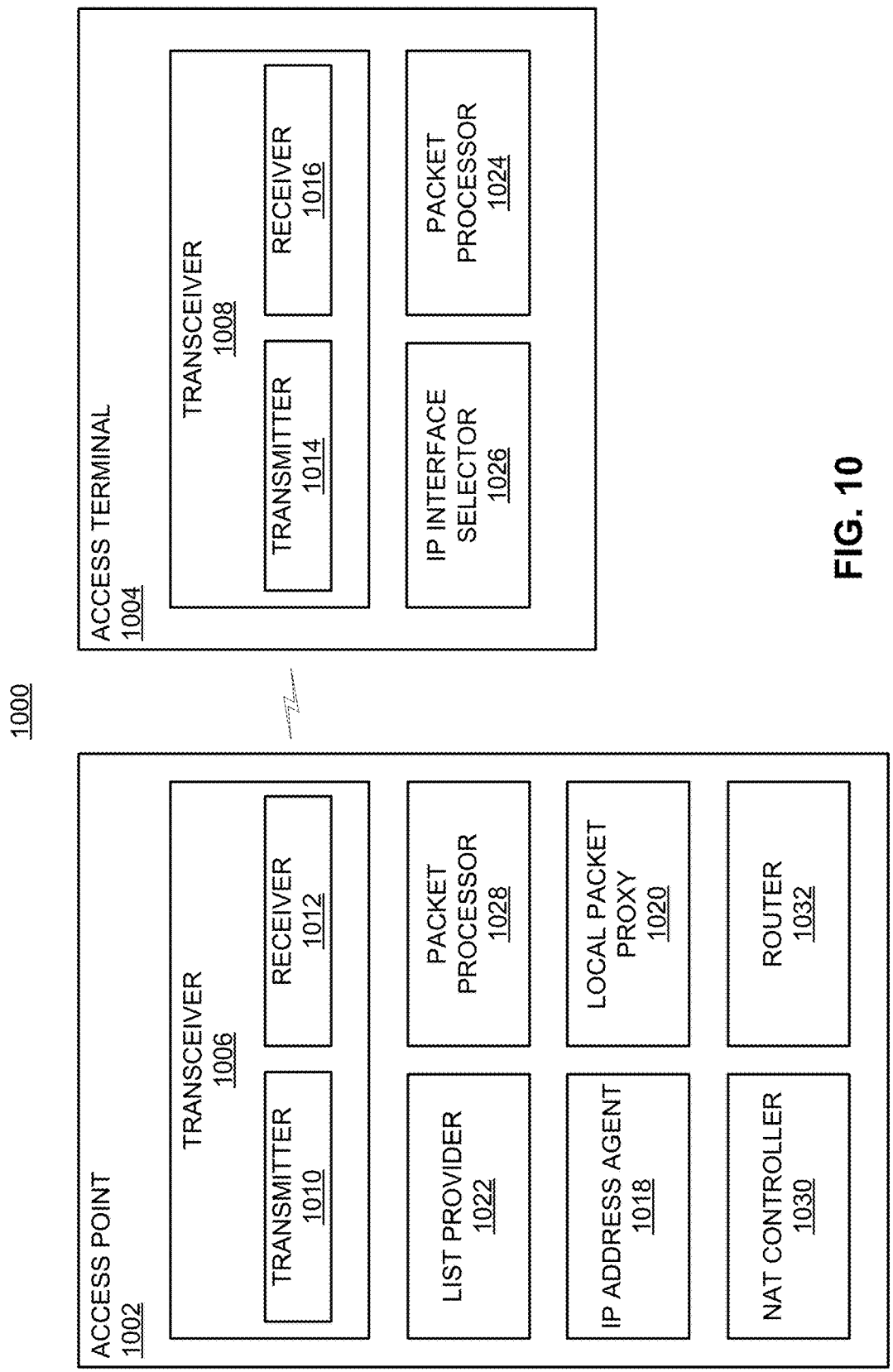
FIG. 10 is a simplified block diagram of several sample aspects of components of wireless nodes that may be employed in conjunction with providing local IP access.

These and other aspects of local IP access-related functionality that may be provided in accordance with the teachings herein will now be described in more detail with reference to FIGS. 2-10. FIGS. 2-5 relate to implementations that employ multiple IP interfaces. FIGS. 6-9 relate to implementations where a local access point includes NAT functionality. FIG. 10 depicts several components that may be employed in nodes such as an access point 1002 (e.g., corresponding to access points 102, 202 and 602 described herein) and an access terminal 1004 (e.g., corresponding to access terminals 104, 204 and 604 described herein) to provide local IP access-related functionality as taught herein.

In FIG. 10, the access point 1002 and the access terminal 1004 include respective transceivers 1006 and 1008 for communicating with one another and with other nodes. The transceiver 1006 includes a transmitter 1010 for sending signals (e.g., messages and packets) and a receiver 1012 for receiving signals. Similarly, the transceiver 1008 includes a transmitter 1014 for sending signals and a receiver 1016 for receiving signals.

For convenience, FIG. 10 illustrates various components that may be incorporated into the access point 1002 and the access terminal 1004 to facilitate local IP access in various implementations. In practice, however, a given implementation may incorporate only some of the illustrated components. In addition, a given node may contain one or more of the described components. For example, a node may contain multiple transceiver components that enable the node to operate on multiple frequencies and/or communicate via different technology. Also, it should be appreciated that the described components may be incorporated into other nodes in a communication system. For example, other nodes in a system may include components similar to those described for the access point 1002 and the access terminal 1004 to provide similar functionality. The components of FIG. 10 will be described in more detail below.

Figure 2:
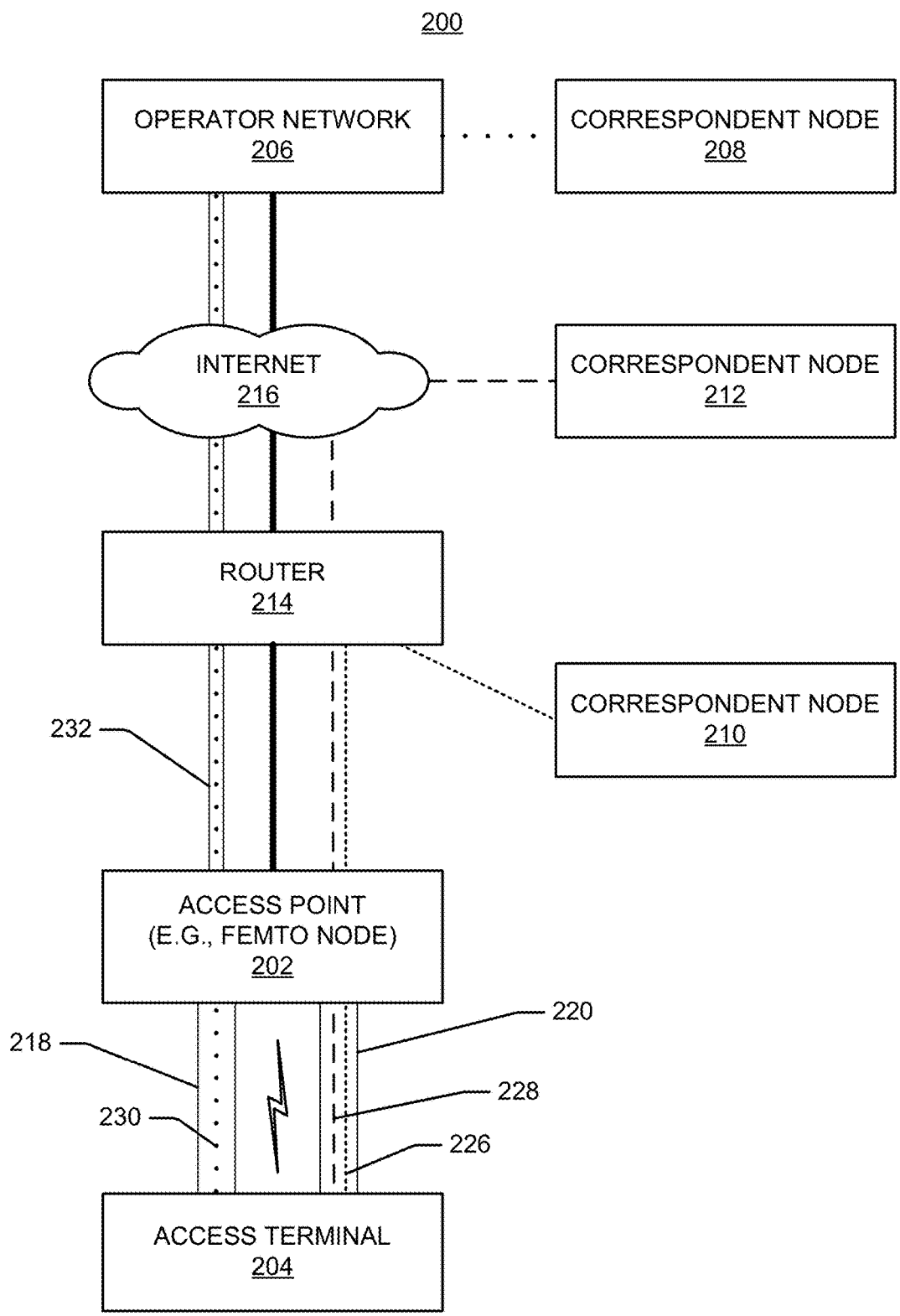
FIG. 2 is a simplified block diagram of several sample aspects of a communication system configured to support local IP access using multiple IP interfaces.

Referring now to FIG. 2, this example illustrates a system 200 where an access terminal 204 uses different IP interfaces (e.g., associated with different streams) to access operator network service and local service. It should be appreciated that in different implementations a different number of IP interfaces (and streams) may be used and different types of service may be accessed via such IP interfaces.

As represented by a pair of lines 218, the access terminal 204 uses a first IP interface to send packets to and receive packets from the operator network 206. In some aspects, the first IP interface is associated with an air-interface stream that is terminated at the operator network (e.g., at a packet data serving node for the access terminal 204 in the operator network 206). As in FIG. 1, traffic flow between the access terminal 204 and a correspondent node 208 is represented by a dotted line 230. In addition, this traffic is sent via a protocol tunnel 232 between the access point 202 and the operator network 206. Here, the access terminal 204 uses an operator assigned IP address when communicating with nodes in the operator network 206.

As represented by a pair of lines 220, the access terminal 204 uses a second IP interface to send and receive packets associated with local service. In some aspects, the second IP interface is associated with an air-interface stream that is terminated at the access point 202 (e.g., the access node for the access terminal 204). The example of FIG. 2 illustrates that the second IP interface may be used for different traffic flows associated with different local services. For example, both the traffic flow between the access terminal 204 and a correspondent node 212 (represented by a dashed line 228) and the traffic flow between the access terminal 204 and a correspondent node 210 (represented by a dashed line 226) are sent via the second IP interface. Here, the access terminal 204 uses a local IP address assigned by a local router 214 when communicating with other nodes to access a local service.

To support local IP access via the second IP interface, the access point 202 may set up a packet filter for the access terminal 204 to use for a local IP domain (e.g., local network). In addition, the access point 202 may provide proxy functionality such as proxy ARP functionality and agent functionality such as dynamic host configuration protocol ("DHCP") relay functionality. These aspects of the system 200 will be described in more detail with reference to the flowcharts of FIGS. 3-5.

Figure 3:
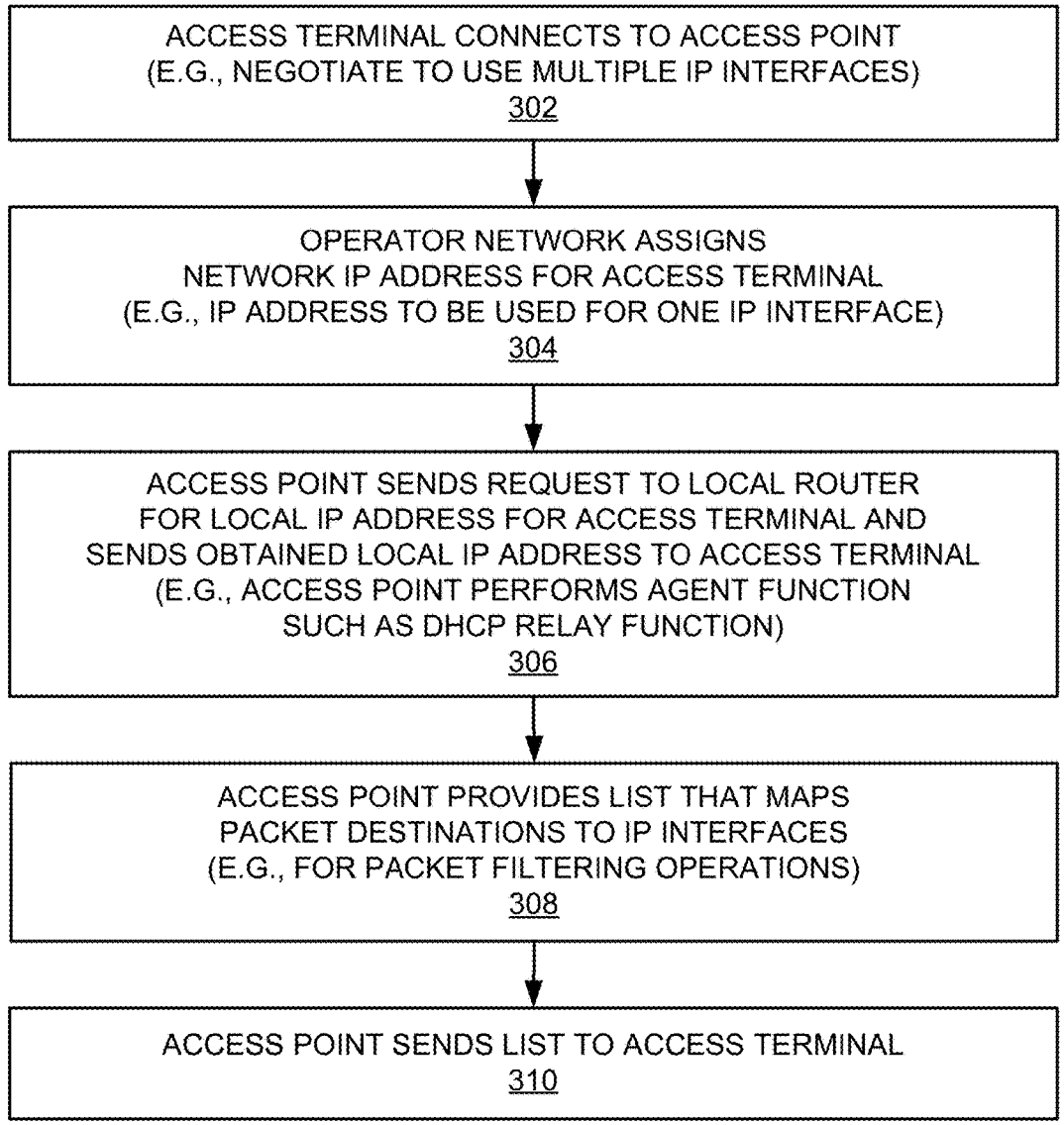
FIG. 3 is a flowchart of several sample aspects of operations that may be performed to setup local IP access when multiple IP interfaces are employed.
Figure 4A:
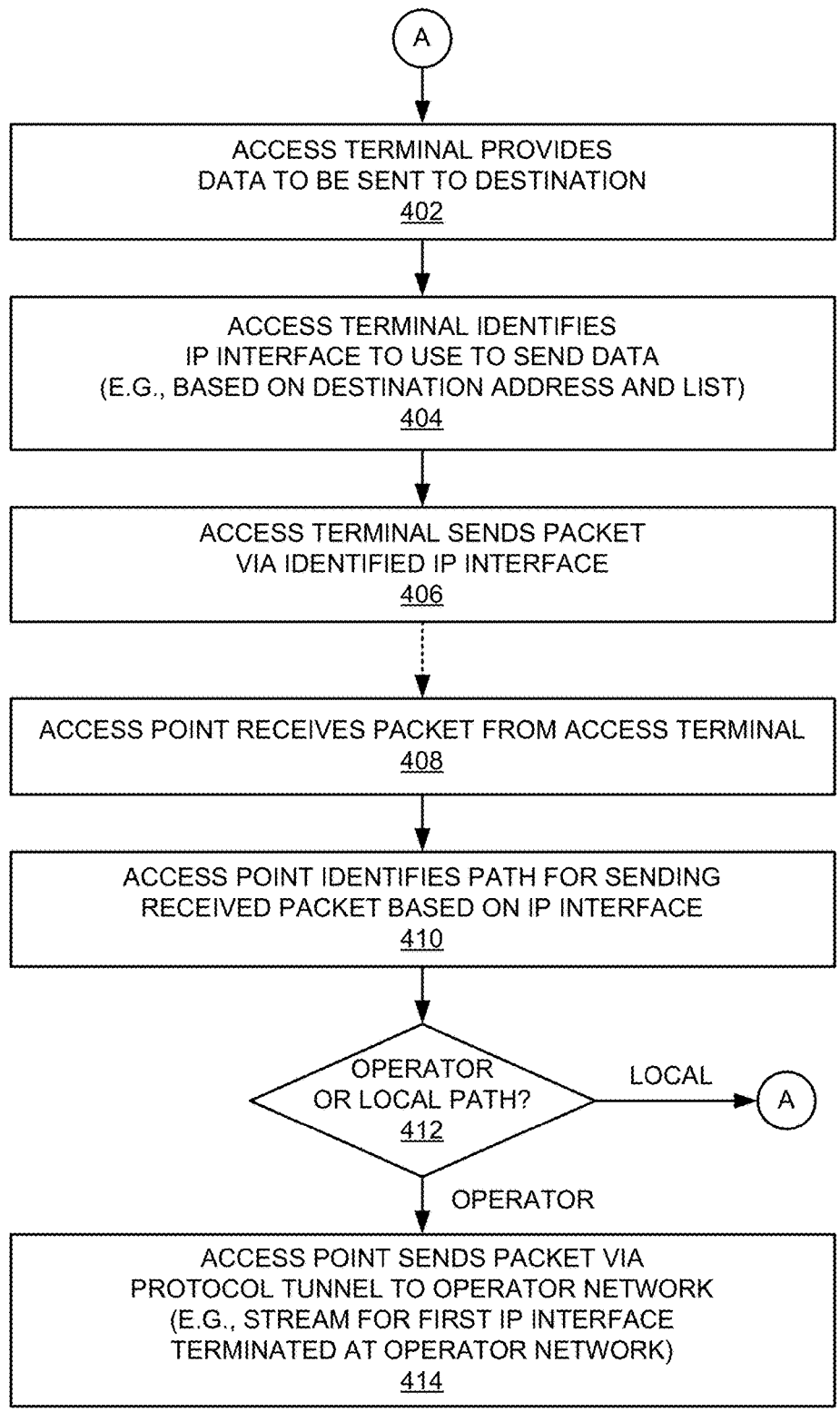
FIGS. 4A and 4B are a flowchart of several sample aspects of operations that may be performed in conjunction with an access terminal sending a packet when multiple IP interfaces are employed.
Figure 4B:
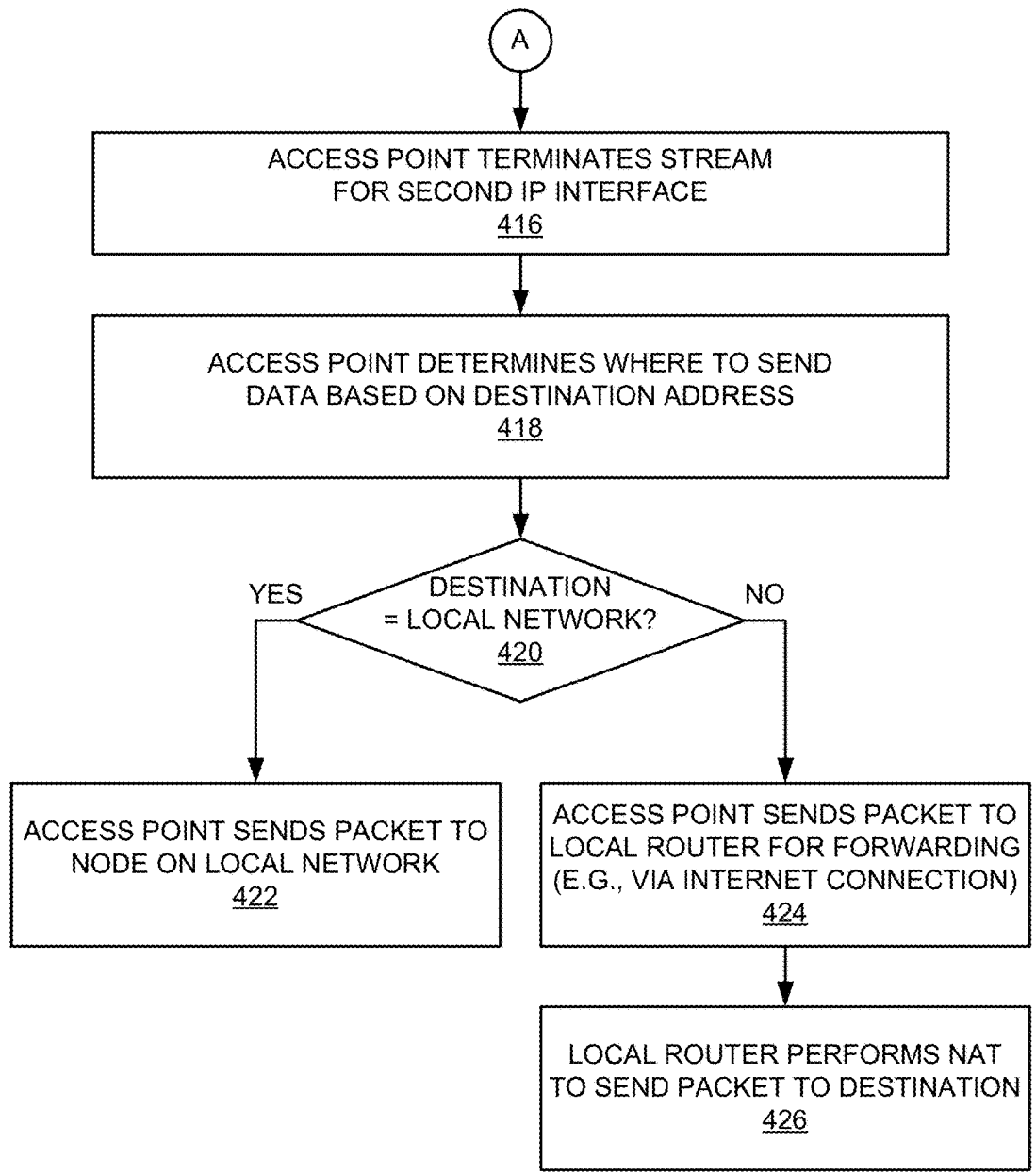
Figure 5:
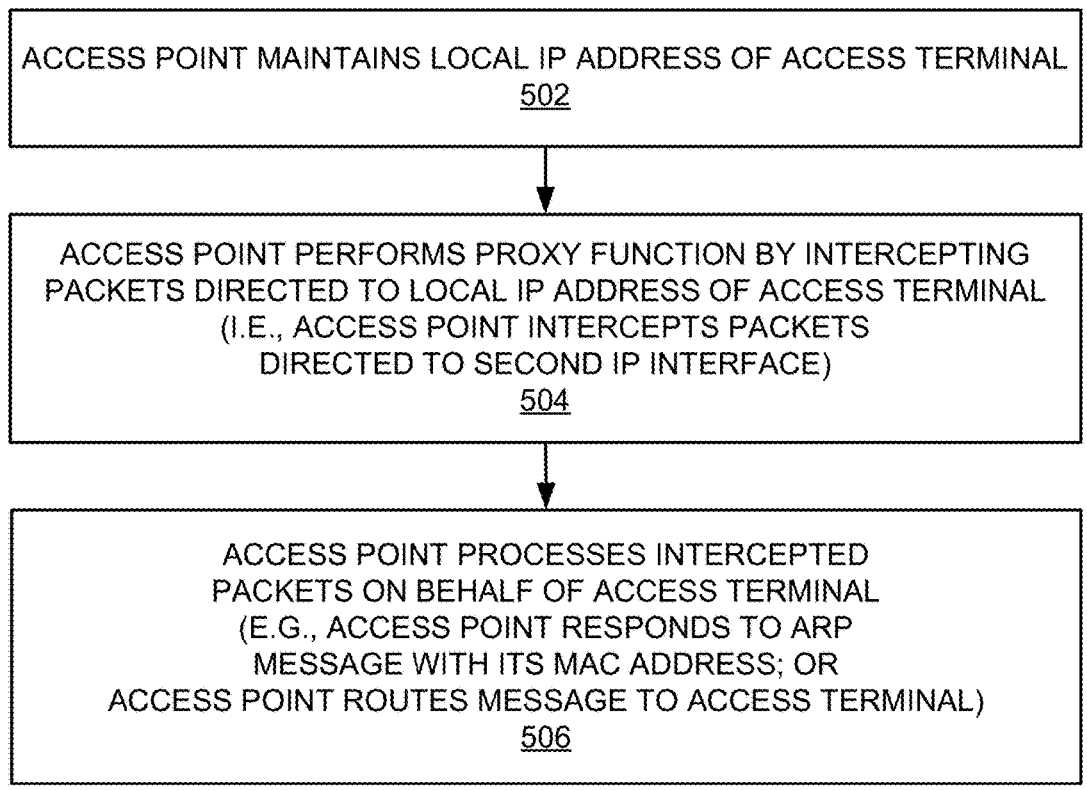
FIG. 5 is a flowchart of several sample aspects of operations that may be performed in conjunction with a proxy function that handles packets sent to an access terminal by local nodes.

For convenience, the operations of FIGS. 3-5 (or any other operations discussed or taught herein) may be described as being performed by specific components (e.g., components of the system 100 and/or a system 1000 as depicted in FIG. 10). It should be appreciated, however, that these operations may be performed by other types of components and may be performed using a different number of components. It also should be appreciated that one or more of the operations described herein may not be employed in a given implementation.

FIG. 3 describes several operations that may be invoked to enable an access terminal to use multiple IP interfaces to access different services. In particular, these operations relate to setting up the IP interfaces and providing a list to be used for packet filtering operations.

As represented by block 302, at some point in time the access terminal 204 connects to the access point 202. For example, the access point 202 may comprise a home femto node for the access terminal 204. Thus, the access terminal 204 may connect to the access point 202 whenever the access terminal 204 is at home.

In conjunction with setting up a connection, the access point 202 and the access terminal 104 may negotiate to determine whether both nodes support the use of multiple IP interfaces and whether multiple IP interfaces will be used for this connection. For example, access points in the system 200 may be configured to provide local IP access for only certain access terminals (e.g., home access terminals). Accordingly, the access point 202 may verify whether the access terminal 204 is authorized to access local services before providing access to those services. Similarly, the access terminal 204 may determine whether the access point 202 will provide local IP access before the access terminal 204 attempts to establish multiple IP interfaces. In the discussion that follows, it is assumed that the access point 202 and the access terminal 104 will support multiple IP interfaces.

As represented by block 304, the operator network 206 assigns an IP address for the access terminal 204. The access terminal 204 uses this IP address when accessing operator network services via a first IP interface.

As represented by block 306, the access point 202 (e.g., by operation of an IP address agent 1018 as shown in FIG. 10) may provide an agent function (e.g., a DHCP relay function) to obtain a local network IP address for the access terminal 204. For example, the access point 202 may send a message to a local router 214 requesting an IP address to be used on the local area network serviced by the router 214. The access point 202 may then maintain a record of this IP address and send the IP address to the access terminal 204.

The access point 202 (e.g., a list provider 1022) also may set up a packet filter that the access terminal 204 uses to select the IP interface that should be used for sending a given packet. For example, as represented by block 308, the access point 202 may provide a list that maps different packet destinations to different IP interfaces. In some aspects, this list may be based on operator policy, destination address, destination subnet, protocol type of a packet, TCP port, UDP port, or some combination of these items. The access point 202 (e.g., transmitter 1010) sends the list to the access terminal 204 as represented by block 310.

Such a packet filter list may take various forms. In addition, packet destinations and IP interfaces may be represented in various ways in the list. In some implementations the packet destinations are indicated in the list by information indicative of the destination (e.g., a full destination address, a subnet address, a port, a protocol type) and the IP interfaces are indicated by IP addresses (e.g., an IP address of the access terminal 204). For example, a subnetwork address corresponding to the operator network 206 may be mapped to a first IP interface, a subnetwork address corresponding to the local area network served by the router 214 may be mapped to a second IP interface, a subnetwork address corresponding to the correspondent node 212 may be mapped to the second IP interface, and so on.

Referring now to FIGS. 4A and 4B, several operations that may be performed in conjunction with the access terminal 204 sending packets via the first and second IP interfaces to network and local destinations, respectively, will be described.

Blocks 402-406 of FIG. 4A describe operations that the access terminal 204 may perform to send a packet over-the-air to the access point 202. As represented by block 402, at some point in time the access terminal 204 provides (e.g., generates) data to be sent to a particular destination. In addition, the access terminal 204 (e.g., packet processor 1024 of FIG. 10) generates a packet for sending the data. Here, the source address for the packet is the local IP address the access terminal 204 (e.g., the packet processor 1024) received from the access point 202.

As represented by block 404, the access terminal 204 (e.g., an IP interface selector 1026) uses the packet filter list that it received from the access point 202 to select the IP interface that should be used to send the packet. For example, the access terminal 204 may compare the destination for the packet (e.g., the packet destination address) with the packet destination information in the list (e.g., subnetwork addresses) to identify the IP interface to be used for the packet. Here, a default IP interface may be defined (e.g., based on operator policy) for use in the event a match for a particular destination is not found in the list.

As represented by block 406, the access terminal 204 (e.g., the packet processor 1024) may then send the packet via the identified IP interface. For example, if the packet is to be sent via the first IP interface, the access terminal 204 may send the packet via an air-interface stream that terminates at the operator network 206. Conversely, if the packet is to be sent via the second IP interface, the access terminal 204 may send the packet via an air-interface stream that terminates at the access point 202. Here, it should be appreciated that the access terminal 204 may send different types of streams (e.g., at the same time or different times) over a common air-interface established between the access point 202 and the access terminal 204.

Blocks 408-426 of FIGS. 4A and 4B describe operations that may be performed to send the packet to the appropriate destination. These operations commence with the access point 202 (e.g., packet processor 1028 of FIG. 10) receiving the packet from the access terminal 204 at block 408.

As represented by block 410, the access point 202 (e.g., packet processor 1028) determines the appropriate path for sending the received packet to its destination. Here, the access point 202 may identify the path based on the IP interface associated with the received packet. For example, at block 412 the access point 202 may determine whether the packet should be sent via a path to the operator network (e.g., if the packet was sent via the first IP interface) or a local path (e.g., if the packet was sent via the second IP interface).

As represented by block 414, in the event the operator network path is identified at blocks 410 and 412, the access point 202 (e.g., packet processor 1028) encapsulates the packet in the protocol tunnel 232 for transmission to the operator network 206. The operator network 206 provides the termination point for this stream, and forwards the packet through the network to the designated destination (e.g., the node 208). In this case, the source address and the destination address (e.g., the IP address of node 208) of the packet may not be altered as the packet travels through the system 200.

As represented by block 416 of FIG. 4B, in the event the local path is identified at blocks 410 and 412, the access point 202 (e.g., packet processor 1028) provides the termination point for the stream. Here, the access point 202 determines where to send the packet based on the destination of the packet (blocks 418 and 420). For example, the access point 202 may determine whether the destination of the packet is on the local network.

If so, as represented by block 422, the access point 202 (e.g., packet processor 1028) sends the packet to the appropriate node on the local network (e.g., correspondent node 210). In this case, neither the access point 202 nor the router 214 alters the source address (local address) or the destination address (local address) of the packet.

If the destination of the packet is not on the local network (e.g., the destination is the correspondent node 212 which has a public address), the operational flow instead proceeds from block 420 to block 424. Here, the access point 202 may send the packet to the router 214 for forwarding to the designated destination (e.g., via the Internet 216). In this case, at block 426 the router 214 may perform a NAT operation to change the source address of the packet from the local address of the access terminal 204 to the public address of the router 214 and an assigned port number (e.g., 60.d.e.f, port g). Similarly, when a packet is sent from the correspondent node 212 to the access terminal 204, the router 214 will perform a NAT operation to change the destination address of the packet from the public address of the router 214 and the assigned port number (e.g., 60.d.e.f, port g) to the local address of the access terminal 204.

FIG. 5 describes several proxy operations that the access point 202 may perform (e.g., by operation of a local packet proxy 1020 as shown in FIG. 10) on behalf of the access terminal 204 for local packets sent to the access terminal 204. As represented by block 502, the access point 202 may maintain a record of the local IP address that is assigned to the access terminal 204 (e.g., as discussed above). As represented by block 504, in conjunction with the proxy function, the access point 202 intercepts any packets directed to the access terminal 204 via the local network (e.g., packets directed to the second IP interface). As represented by block 506, the access point 202 processes an intercepted packet on behalf of the access terminal 204. The operations performed at block 506 may depend on the type of packet that has been intercepted. In some cases the access point 202 may simply route the intercepted packet to the access terminal 204. In some cases, the access point 202 may respond to an intercepted packet on behalf of the access terminal 204. For example, the access point 202 may provide a proxy ARP function, whereby the access point 202 processes ARP messages directed to the access terminal 204. Here, other nodes on the local network may be aware of the IP address assigned to the access terminal 204, but may not know the MAC address to be used to send messages to the access terminal 204. Thus, at some point in time the access point 202 may receive an ARP message directed to the local IP address of the access terminal 204. In this case, the access point 202 may respond to this ARP message with a message that indicates that the MAC address of the access point 202 may be used to access the access terminal 204. Advantageously, through the use of this proxy ARP functionality, another node (e.g., a server) in the local network may initiate an access of the access terminal 204. Thus, an implementation as described in FIG. 2 may support both access terminal-initiated communication and server-initiated communication on the local network.

As described above, the use of multiple IP interfaces may be advantageously employed to facilitate local IP access. In the above example, both access terminal-initiated local access and server-initiated local access are supported. In addition, an access point need not provide packet data serving node ("PDSN") functions for local IP access. For example, a serving access point does not need an access terminal's operator network IP address (e.g., macro address) for local IP access operations. Moreover, the access point does not need to modify any addresses in the address path. Also, this scheme is not limited to being used with specific upper layers (e.g., it is not limited to use with UDP or TCP ports).

Figure 6:
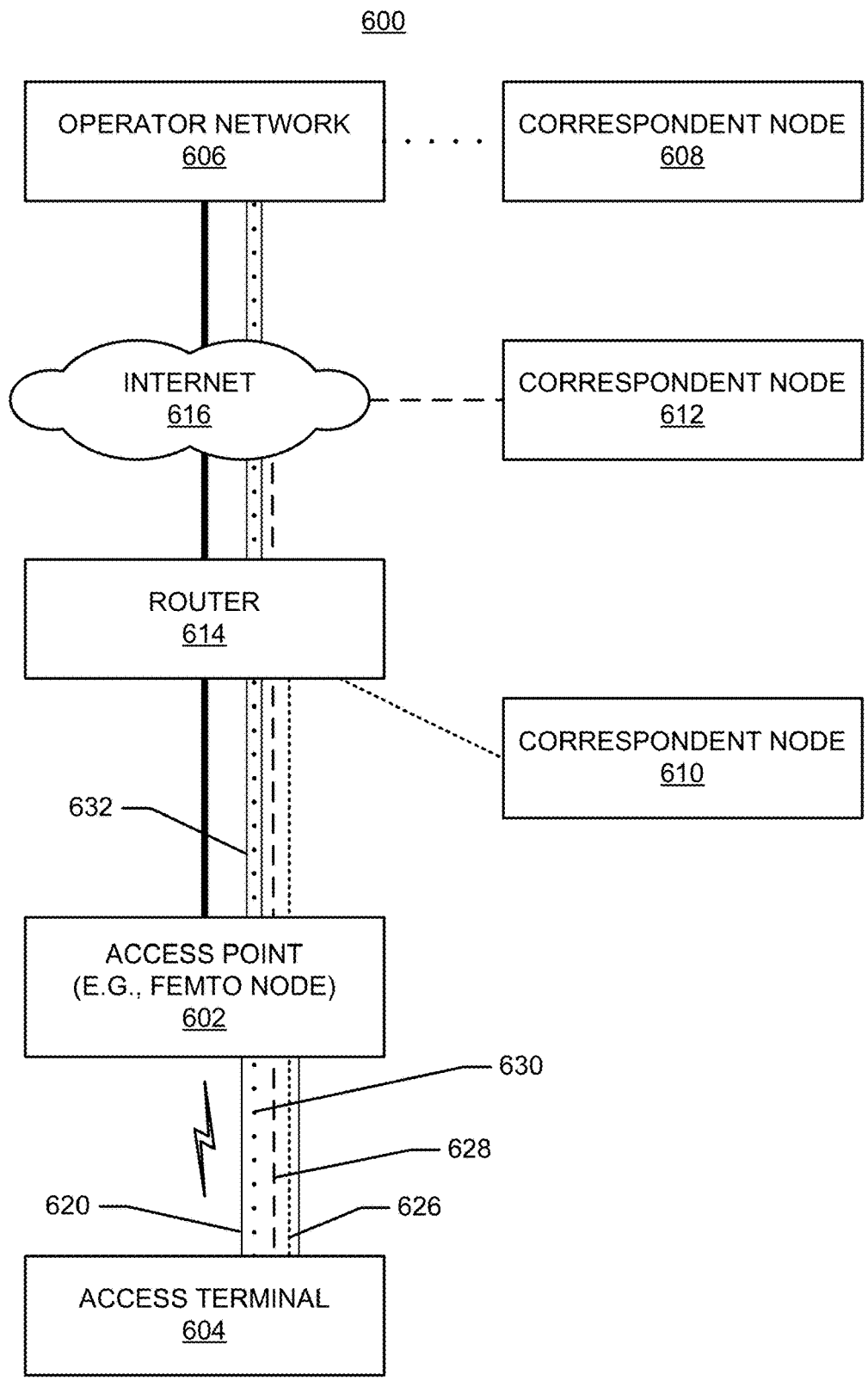
FIG. 6 is a simplified block diagram of several sample aspects of a communication system configured to support local IP access using NAT functionality in an access point.

Referring now to FIG. 6, an access point 602 in a system 600 provides NAT functionality to facilitate local IP access. In this case, only one IP interface and one public IP address is assigned to the access terminal 604. Thus, as represented by a pair of lines 620, the access terminal 604 uses a single IP interface to send packets to and receive packets from the access point 602 for operator network and local traffic. Accordingly, traffic flow between the access terminal 604 and a correspondent node 612 (represented by a dashed line 628), traffic flow between the access terminal 604 and a correspondent node 610 (represented by a dashed line 626), and traffic flow between the access terminal 604 and a correspondent node 608 (represented by a dotted line 630) are sent via the single IP interface. As above, the operator network traffic is sent via a protocol tunnel 632 between the access point 602 and the operator network 606.

To route a packet that was received from the access terminal 604, the NAT functionality of the access point 602 (e.g., as provided by a NAT controller 1030 as shown in FIG. 10) converts the operator network IP address assigned to the access terminal 604 to a local IP address assigned to the access terminal 604 by a local router 614. Thus, in this case, the access point 602 maintains a record of the IP addresses assigned to the access terminal 604 for use in the NAT operations. In addition, the access point 602 intercepts and inspects packets received from the access terminal 604. The access point 602 may then send any packets destined for the operator network over the protocol tunnel. Alternatively, the access point 602 may terminate any packets associated with a local service and send these packets to the appropriate destination.

Figure 7:
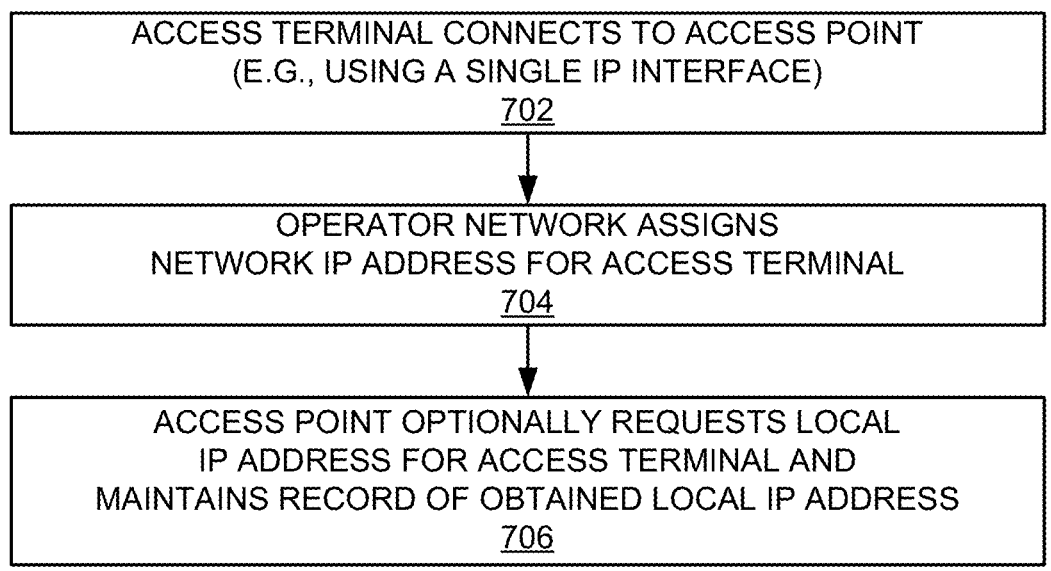
FIG. 7 is a flowchart of several sample aspects of operations that may be performed to setup local IP access when NAT functionality is provided in an access point.

Additional aspects of the system 600 will be described in more detail with reference to the flowcharts of FIGS. 7-9. FIG. 7 describes sample setup operations. FIGS. 8A and 8B describe sample operations that may be performed when the access terminal 604 sends a packet. FIG. 9 describes sample proxy operations that the access point 602 may perform when local packets are sent to the access terminal 604.

As represented by block 702 of FIG. 7, at some point in time the access terminal 604 connects to the access point 602. In this case, the access terminal 604 uses a single IP interface for all traffic. In addition, as represented by block 704, the operator network 606 assigns an IP address for the access terminal 604. These operations may be similar to the corresponding operations described above at blocks 302 and 304.

As represented by block 706, the access point 602 (e.g., the IP address agent 1018) may obtain a local network IP address for the access terminal 604. As discussed above, the access point 602 may send a message to a local router 614 requesting an IP address to be used on the local area network serviced by the router 614. The access point 602 may then maintain a record of this IP address for use in NAT operations.

As represented by block 802 of FIG. 8A, at some point in time the access point 602 receives a packet from the access terminal 604. Here, the source address of the packet will correspond to the operator network IP address assigned to the access terminal 604.

As represented by block 804, the access point 602 (e.g., NAT controller 1030) determines whether it needs to perform a NAT operation on the received packet. In some implementations this decision may be based on the destination of the packet and, optionally, operator network policy. For example, at block 806, the access point 602 may determine based on the destination address (e.g., based on the subnetwork of the destination IP address) whether the packet should be sent via a path to the operator network 606 or via a local path.

As represented by block 808, in the event the operator network path is identified at blocks 804 and 806, the access point 602 encapsulates the packet in the protocol tunnel 632 for transmission to the operator network 606. The operator network 606 then forwards the packet through the network to the designated destination (e.g., the node 608). In this case, the source address and the destination address (e.g., the IP address of node 608) of the packet may not be altered as the packet travels through the system 600.

As represented by block 810 of FIG. 8B, in the event the local path is identified at blocks 804 and 806, the access point 602 (e.g., packet processor 1028) intercepts the packet (e.g., provides the termination point for the packet stream). In this case, at block 812, the access point 602 performs a NAT operation to change the source address of the packet. This NAT operation may be performed in different ways in different implementations.

In some implementations the access point 602 provides a proxy function (e.g., proxy ARP function) and obtains a local IP address for the access terminal 604 as discussed above. In this case, the access point 602 (e.g., the NAT controller 1030) substitutes the obtained IP address for the operator network IP address that the access terminal 604 originally designated as the source address for the packet.

In some implementations the access point 602 provides a "reverse NAT" function. In this case, the access point 602 (e.g., the NAT controller 1030) substitutes its own IP address and an assigned port number for the original source IP address in the packet.

The access point 602 then determines where to send the packet based on the destination of the packet (blocks 814 and 816). For example, the access point 602 may determine whether the destination of the packet is on the local network.

If the destination is the local network, as represented by block 818, the access point 602 sends the packet to the appropriate node on the local network (e.g., correspondent node 610). In this case, the access point 602 will perform a NAT operation to change the source address (public address) of the packet as indicated above.

If the destination of the packet is not on the local network (e.g., the destination is the correspondent node 612 which has a public address), the operational flow instead proceeds from block 816 to block 820. Here, the access point 602 may send the packet to the router 614 for forwarding to the designated destination (e.g., via the Internet 616). In this case, the access point 202 will perform a NAT operation to change the source address (public address) of the packet to the private address of the router 614 and an assigned port number. Subsequently, the router 614 may perform a NAT operation to change the source address of the packet to the public address of the router 614 and an assigned port number (block 822). Complementary operations may likewise be performed when a packet is sent from the correspondent node 612 to the access terminal 604.

Referring now to the proxy operations of FIG. 9, as represented by block 902, the access point 602 maintain a record of the local IP address that is associated with the access terminal 604 for local traffic. As discussed above at block 812, in some cases the access point 602 obtains a local IP address for the access terminal 604 while in other cases the IP address of the access point 602 and a port number are assigned to the access terminal 604.

As represented by block 904, in conjunction with the proxy function, the access point 602 may intercept any packets directed to the access terminal 604 via the local network. Thus, depending on the implementation, the access point 602 may intercept packets having a destination address equal to the local IP address obtained for the access terminal 604, or the access point 602 may intercept packets having a destination address equal to the local IP address of the access point 602 and the port number assigned to the access terminal 604.

As represented by block 906, the access point 602 processes an intercepted packet on behalf of the access terminal 604. The operations performed at block 906 may depend on the type of packet that has been intercepted. In some cases the access point 602 may simply route the intercepted packet to the access terminal 604. In some cases, the access point 602 may respond to an intercepted packet on behalf of the access terminal 604. For example, the access point 602 may provide a proxy ARP function, whereby the access point 602 processes ARP messages directed to the access terminal 604 in a similar manner as discussed above.

In view of the above, NAT functionality may be advantageously employed in an access point to facilitate local IP access. In particular, legacy access terminals (e.g., that do not implement multiple IP interfaces) may be supported in this case.

In some aspects, the scheme of FIG. 6 may support broadcast packets. For example, it may be specified that an access terminal will never send any other broadcast packets except for a well-known message (e.g., a DHCP message). In such a case, a PDSN function in the access point may process any DHCP message in an IP broadcast packet. Any other broadcast packets are then sent to the local subnetwork. Broadcast packets sent by other correspondent nodes will be sent to the access terminal that connects to the access point.

In the example described in FIGS. 7-9, two NAT operations were performed on the packets destined for the correspondent node 612. If it is desired to eliminate one of these NAT operations, routing functionality may be employed in the access point 602 (e.g., as indicated by router 1032 in FIG. 10). In this case, all local nodes may be connected to the access point. The NAT function in the access point may then assign the local IP addresses for all correspondent nodes on the local network. The local router may thus be eliminated or the local router may be configured to not provide NAT functionality.

In the latter case, no correspondent nodes are connected to the local router. The local router may only provide one local IP address for the access point. This will prevent the local router from assigning overlapping addresses with the access point.

In the event the access point receives a packet with a destination address that is in the local subnetwork, the access point converts the original packet source address (e.g., the operator network IP address assigned to the access point) to a local network IP address that the access point assigned to the access terminal. Here, the access point may perform a proxy function (e.g., a proxy ARP function) for this local network IP address.

In the event the access point receives a packet with a destination address that is not in the operator subnetwork (e.g., based on policy) and not in the local subnetwork, the access point may simply forward the packet to the local router (i.e., without performing a NAT operation). The local router may then simply forward the packet (e.g., without performing a NAT operation) to the correspondent node via the ISP. In this case, for the access terminal to receive a response, the access terminal uses a publicly routable address.

In some implementations, local IP access may be accomplished through the use of IP port forwarding. Here, an access terminal may communicate with a node in a local domain using a port forwarding mechanism that may be implemented in a local router (e.g., providing NAT functionality). In this case, the traffic goes through the operator network. As an example, an access terminal may send a packet where the source address is the access terminal's local IP address and the destination address (of a correspondent node attached to the router) is the public address of the router and an assigned port number. This packet is forwarded via a protocol tunnel from the access point to the operator network. The operator network sends the packet back to the router which, in turn, sends the packet to the appropriate correspondent node. For a return packet, the source address is the correspondent node's local IP address and the destination address is the local address of the access terminal. The NAT function of the router changes the source address to the public address of the router and the assigned port number. The router sends the packet to the operator network, whereupon the operator network sends the packet to the access terminal via the protocol tunnel.

As mentioned above, local IP access schemes as taught herein may be used in a mixed deployment that includes macro coverage (e.g., a large area cellular network such as a 3G network, typically referred to as a macro cell network or a Wide Area Network—WAN) and smaller coverage (e.g., a residence-based or building-based network environment, typically referred to as a Local Area Network—LAN). Here, as an access terminal ("AT") moves through such a network, the access terminal may be served in certain locations by access points that provide macro coverage while the access terminal may be served at other locations by access points that provide smaller area coverage. In some aspects, the smaller area coverage nodes may be used to provide incremental capacity growth, in-building coverage, and different services, all leading to a more robust user experience.

A node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network is provided in FIG. 11.

Figure 11:
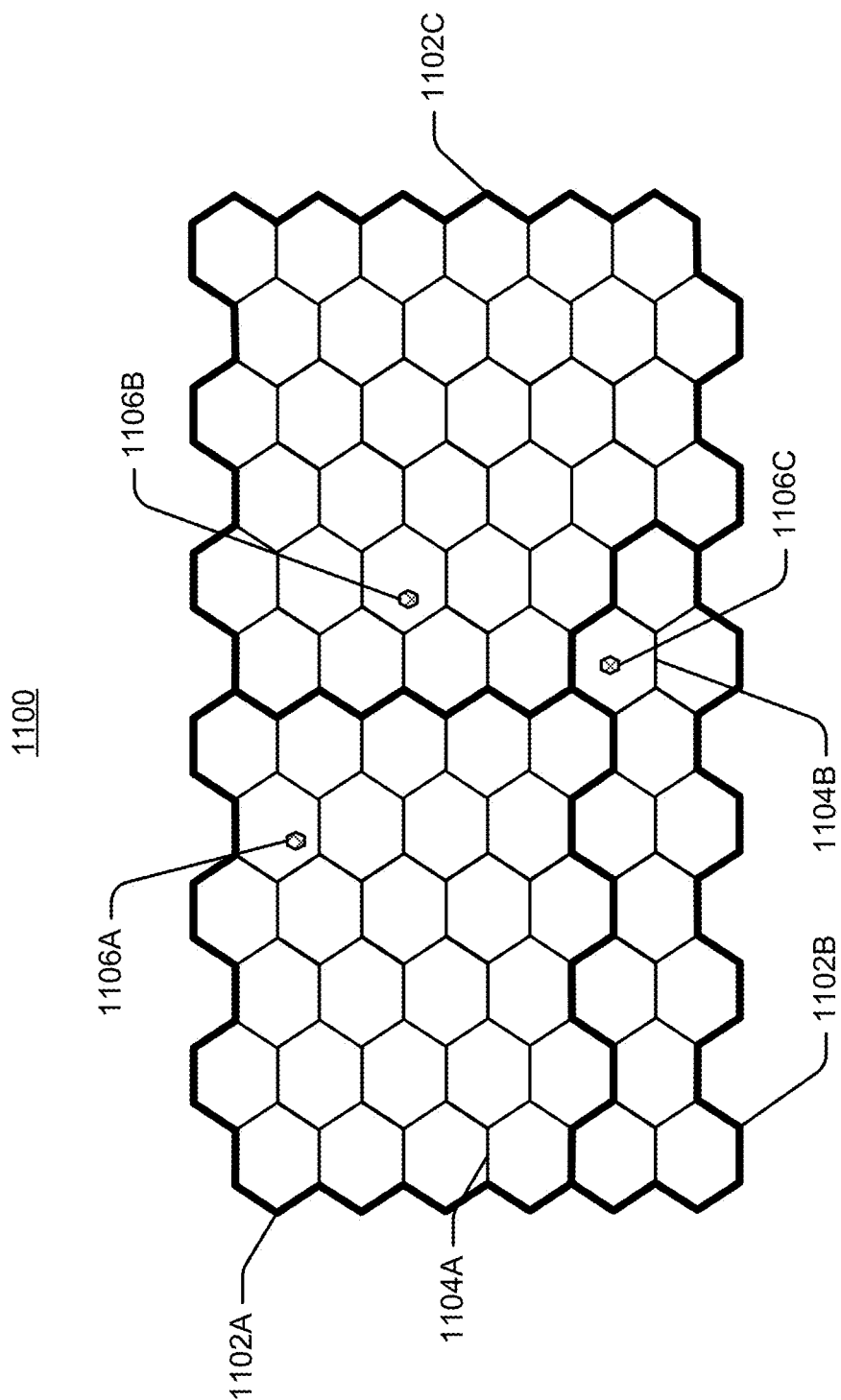
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may lie partially within or outside of a macro coverage area 1104. Also, one or more pico coverage areas (not shown) may be defined within one or more tracking areas 1102 or macro coverage areas 1104. It should be appreciated that there could be multiple femto coverage areas within a macro coverage area, either within it or straddling across boundaries with adjacent macro cells.

Figure 12:
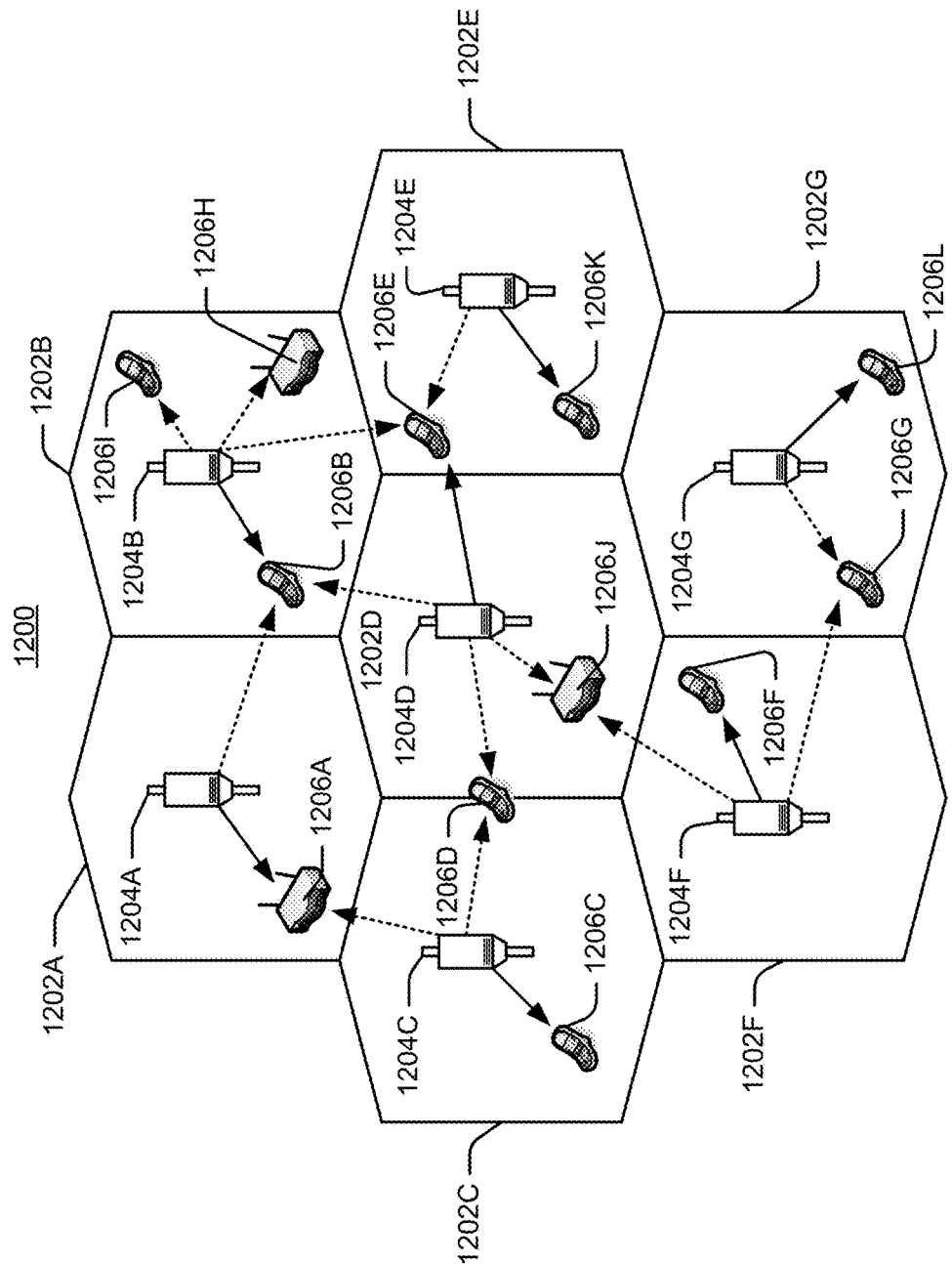
FIG. 12 is a simplified diagram of a wireless communication system.

FIG. 12 illustrates several aspects of a wireless communication system 1200 comprising multiple cells 1202, such as, for example, macro cells 1202A-1202G, with each cell being serviced by a corresponding access point 1204 (e.g., access points 1204A-1204G). Thus, the macro cells 1202 may correspond to the macro coverage areas 1104 of FIG. 11. As shown in FIG. 12, access terminals 1206 (e.g., access terminals 1206A-1206L) may be dispersed at various locations throughout the system over time. Each access terminal 1206 may communicate with one or more access points 1204 on a forward link ("FL") and/or a reverse link ("RL") at a given moment, depending upon whether the access terminal 1206 is active and whether it is in soft handoff, for example. The wireless communication system 1200 may provide service over a large geographic region. For example, macro cells 1202A-1202G may cover a few blocks in a neighborhood or several square miles in rural environment.

Figure 13:
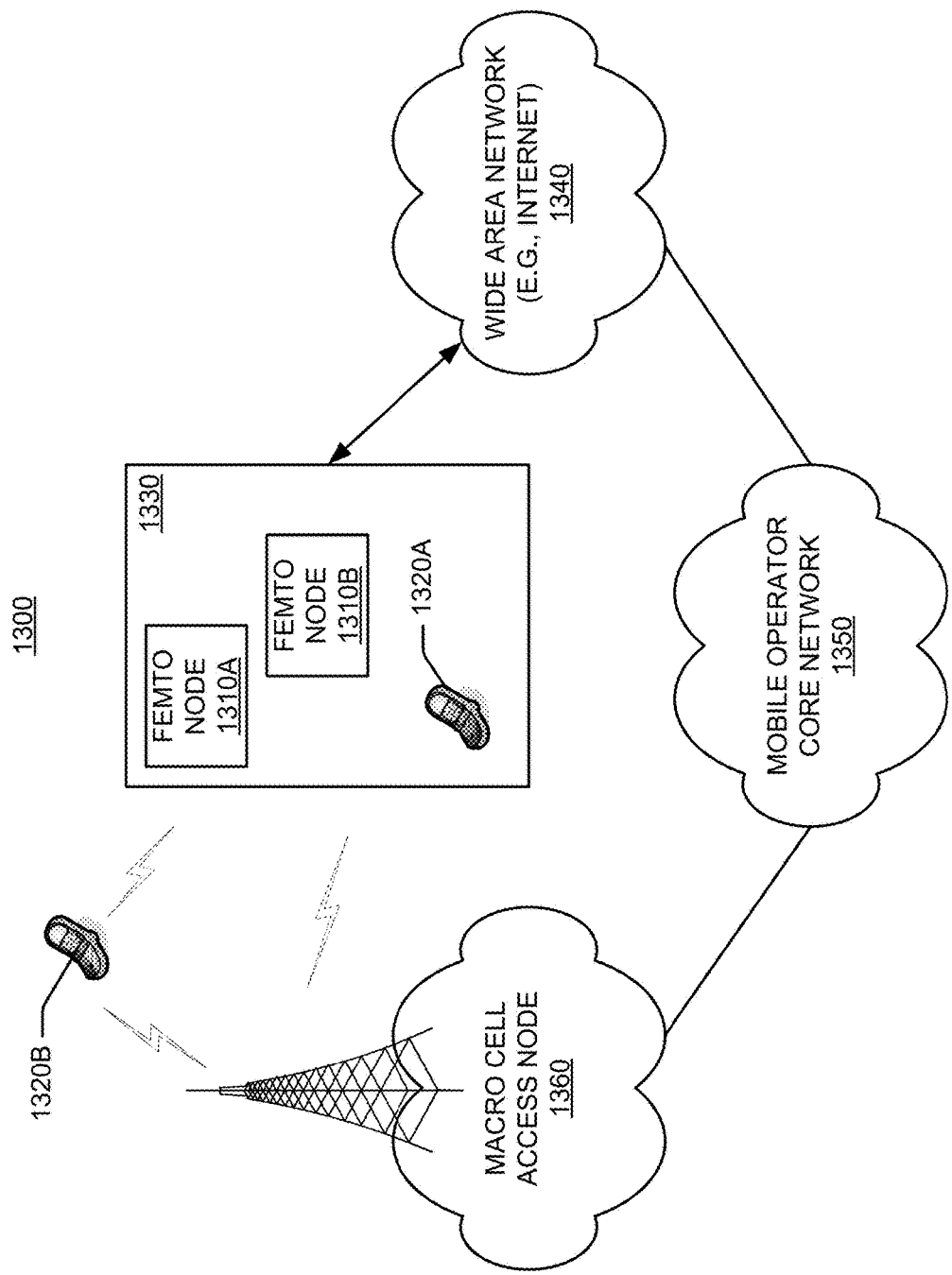
FIG. 13 is a simplified diagram of a wireless communication system including femto nodes.

FIG. 13 is an example of a system 1300 that illustrates how one or more femto nodes may be deployed within a network environment (e.g., the system 1200). The system 1300 includes multiple femto nodes 1310 (e.g., femto nodes 1310A and 1310B) installed in a relatively small area coverage network environment (e.g., in one or more user residences 1330). Each femto node 1310 may be coupled to a wide area network 1340 (e.g., the Internet) and a mobile operator core network 1350 via a DSL router, a cable modem, a wireless link, or other connectivity means (not shown).

The owner of a femto node 1310 may subscribe to mobile service, such as, for example, 3G mobile service, offered through the mobile operator core network 1350. In addition, an access terminal 1320 may be capable of operating both in macro environments and in smaller area coverage (e.g., residential) network environments. In other words, depending on the current location of the access terminal 1320, the access terminal 1320 may be served by a macro cell access point 1360 associated with the mobile operator core network 1350 or by any one of a set of femto nodes 1310 (e.g., the femto nodes 1310A and 1310B that reside within a corresponding user residence 1330). For example, when a subscriber is outside his home, he may be served by a standard macro access point (e.g., access point 1360) and when the subscriber is near or inside his home, he may be served by a femto node (e.g., node 1310A). Here, a femto node 1310 may be backward compatible with legacy access terminals 1320.

A node (e.g., a femto node) may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1310 that reside within the corresponding user residence 1330). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
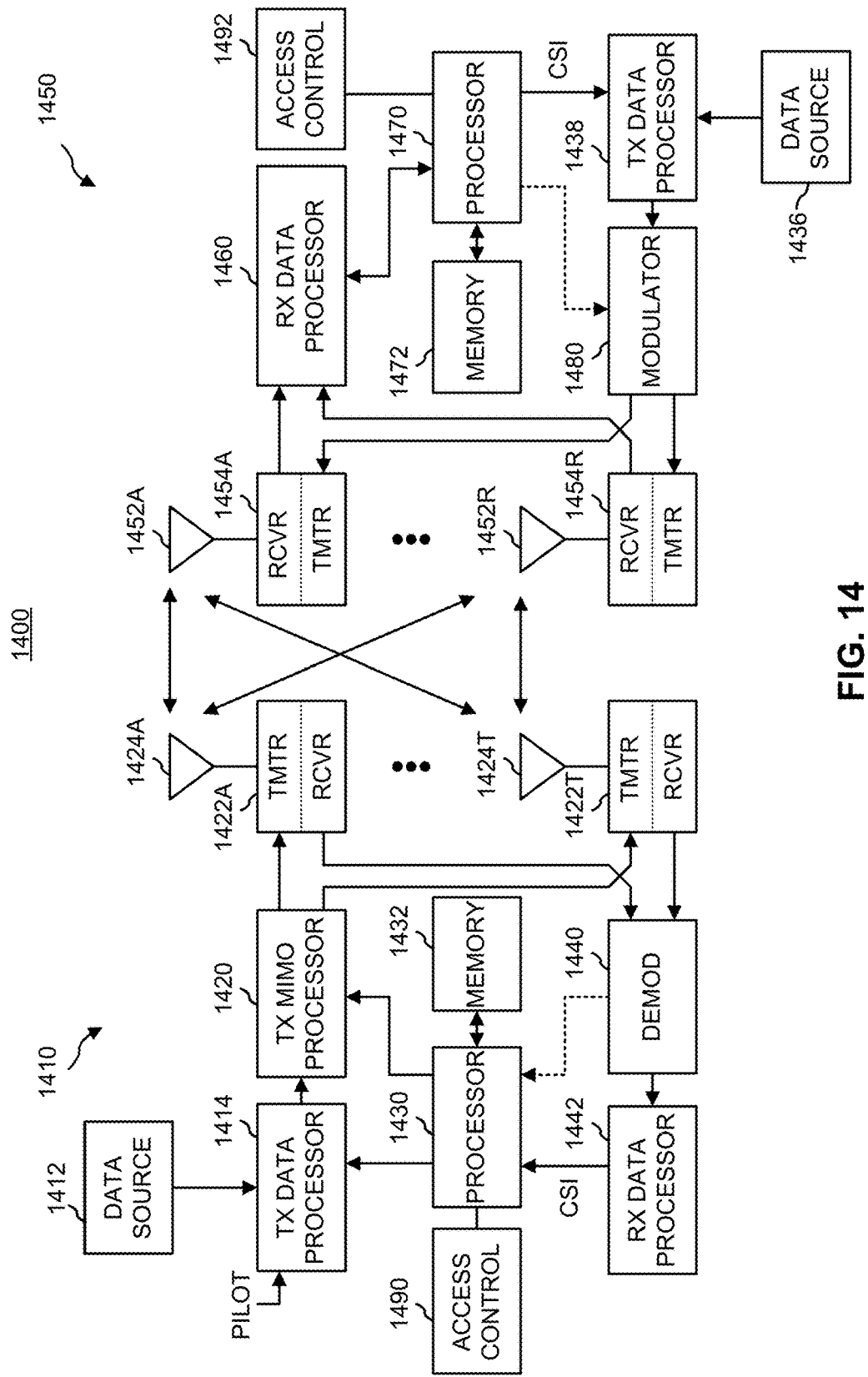
FIG. 14 is a simplified block diagram of several sample aspects of communication components.
Figure 15:
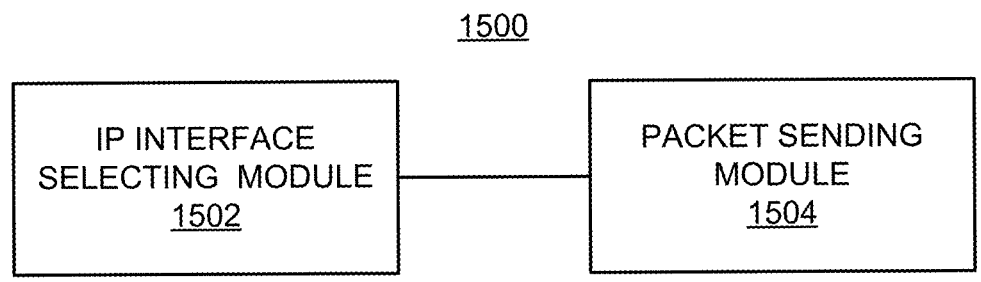
FIGS. 15-18 are simplified block diagrams of several sample aspects of apparatuses configured to provide local IP access as taught herein.
Figure 16:
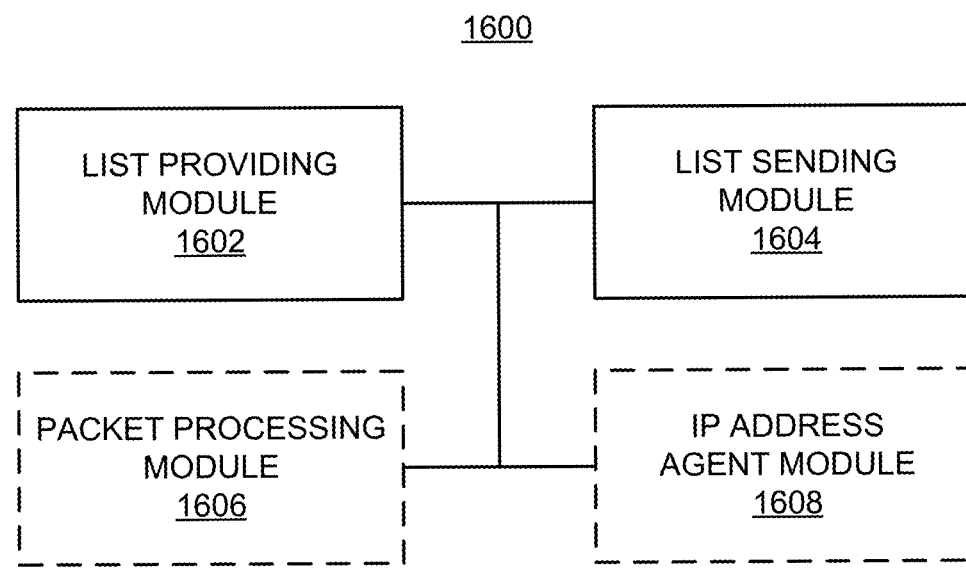
Figure 17:
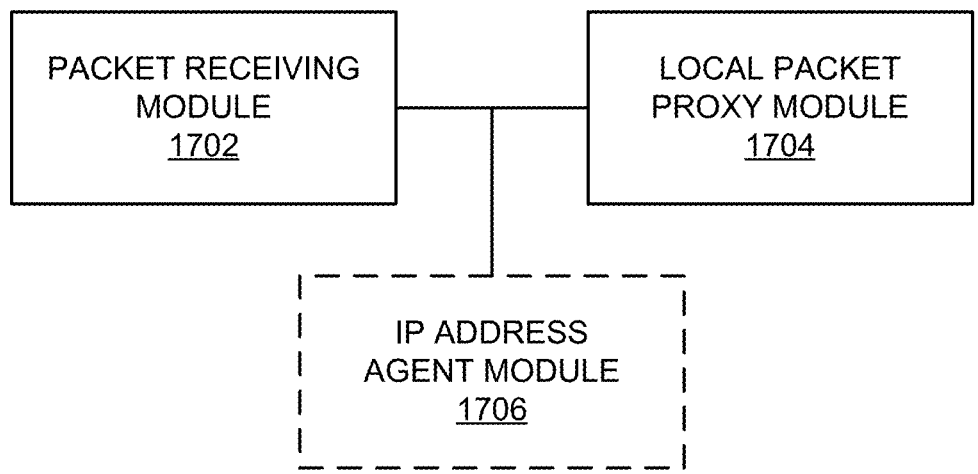
Figure 18:
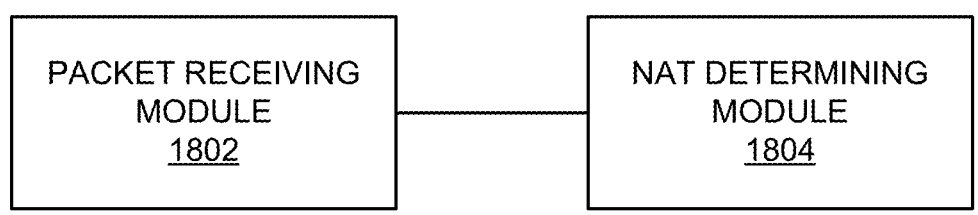

The teachings herein may be incorporated into a node (e.g., a device) employing various components for communicating with at least one other node. FIG. 14 depicts several sample components that may be employed to facilitate communication between nodes. Specifically, FIG. 14 illustrates a wireless device 1410 (e.g., an access point) and a wireless device 1450 (e.g., an access terminal) of a MIMO system 1400. At the device 1410, traffic data for a number of data streams is provided from a data source 1412 to a transmit ("TX") data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver ("XCVR") 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator ("DE-MOD") 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform local IP access-related operations as taught herein. For example, an access control component 1490 may cooperate with the processor 1430 and/or other components of the device 1410 to send/receive signals to/from another device (e.g., device 1450) as taught herein. Similarly, an access control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the access control component 1490 and the processor 1430 and a single processing component may provide the functionality of the access control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), an eBS, a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 15-18, apparatuses 1500, 1600, 1700, and 1800 are represented as a series of interrelated functional modules. Here, an IP interface selecting module 1502 may correspond at least in some aspects to, for example, an IP interface identifier as discussed herein. A packet sending module 1504 may correspond at least in some aspects to, for example, a packet processor as discussed herein. A list providing module 1602 may correspond at least in some aspects to, for example, a list provider as discussed herein. A list sending module 1604 may correspond at least in some aspects to, for example, a transmitter as discussed herein. A packet processing module 1606 may correspond at least in some aspects to, for example, a packet processor as discussed herein. An IP address controlling module 1608 may correspond at least in some aspects to, for example, an IP address agent as discussed herein. A packet receiving module 1702 may correspond at least in some aspects to, for example, a packet processor as discussed herein. A local packet proxy module 1704 may correspond at least in some aspects to, for example, a local packet proxy as discussed herein. An IP address agent module 1706 may correspond at least in some aspects to, for example, an IP address agent as discussed herein. A packet receiving module 1802 may correspond at least in some aspects to, for example, a packet processor as discussed herein. A NAT determining module 1804 may correspond at least in some aspects to, for example, a NAT controller as discussed herein.

The functionality of the modules of FIGS. 15-18 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 15-18 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   verifying that an access terminal is authorized to access local services;
   sending to the access terminal a list that maps packet destinations to different Internet Protocol (IP) interfaces, wherein the different IP interfaces include at least a first IP interface and a second IP interface, wherein the second IP interface is associated with an IP address assigned to the access terminal for accessing the local services on a local network, and wherein the packet destinations in the list are for packets sent from the access terminal;
   receiving a packet from the access terminal; and
   determining, based on an IP interface associated with the packet, whether to send the packet via a path to an operator network or a local path.

2. The method of claim 1, further comprising encapsulating the packet in a protocol tunnel for transmission to the operator network when a determination is made to send the packet via the path to the operator network.

3. The method of claim 1, further comprising determining whether a destination of the packet is on the local network when a determination is made to send the packet via the local path.

4. The method of claim 3, further comprising:
   sending the packet to a node on the local network when the destination is on the local network; and
   sending the packet to a local router for forwarding to the destination when the destination is not on the local network.

5. The method of claim 4, wherein the packet is destined for a node on the local network.

6. The method of claim 4, wherein the packet is destined for a node that is accessible via an Internet connection of the local router for the local network.

7. The method of claim 1, further comprising:
   sending a request to a local router to obtain an IP address for the local network for the access terminal; and
   sending the IP address for the local network to the access terminal.

8. The method of claim 1, wherein the method is implemented by an access point, and wherein the access point is a femto node.

9. An apparatus for communication, comprising:
   a processor configured to verify that an access terminal is authorized to access local services;
   a list provider configured to send to the access terminal a list that maps packet destinations to different Internet Protocol (IP) interfaces, wherein the different IP interfaces include at least a first IP interface and a second IP interface, wherein the second IP interface is associated with an IP address assigned to the access terminal for accessing the local services on a local network, and wherein the packet destinations in the list are for packets sent from the access terminal; and a packet processor configured to receive a packet from the access terminal at an access point and to determine, based on an IP interface associated with the packet, whether to send the packet via a path to an operator network or a local path.

10. The apparatus of claim 9, wherein the packet processor is further configured to encapsulate the packet in a protocol tunnel for transmission to the operator network when a determination is made to send the packet via the path to the operator network.

11. The apparatus of claim 9, wherein the packet processor is further configured to determine whether a destination of the packet is on the local network when a determination is made to send the packet via the local path.

12. The apparatus of claim 11, wherein the transceiver is further configured to:

send the packet to a node on the local network when the destination is on the local network; and send the packet to a local router for forwarding to the destination when the destination is not on the local network.

13. The apparatus of claim 12, wherein the packet is destined for a node on the local network.

14. The apparatus of claim 12, wherein the packet is destined for a node that is accessible via an Internet connection of the local router for the local network.

15. An apparatus for communication, comprising:

means for verifying that an access terminal is authorized to access local services;

means for sending to the access terminal a list that maps packet destinations to different Internet Protocol (IP) interfaces, wherein the different IP interfaces include at least a first IP interface and a second IP interface, wherein the second IP interface is associated with an IP address assigned to the access terminal for accessing the local services on a local network, and wherein the packet destinations in the list are for packets sent from the access terminal;

means for receiving a packet from the access terminal; and means for determining, based on an IP interface associated with the packet, whether to send the packet via a path to an operator network or a local path.

16. The apparatus of claim 15, further comprising means for encapsulating the packet in a protocol tunnel for transmission to the operator network when a determination is made to send the packet via the path to the operator network.

17. The apparatus of claim 15, further comprising means for determining whether a destination of the packet is on the local network when a determination is made to send the packet via the local path.

18. The apparatus of claim 17, further comprising:

means for sending the packet to a node on the local network when the destination is on the local network; and means for sending the packet to a local router for forwarding to the destination when the destination is not on the local network.

19. The apparatus of claim 18, wherein the packet is destined for a node on the local network.

20. The apparatus of claim 18, wherein the packet is destined for a node that is accessible via an Internet connection of the local router for the local network.

21. A non-transitory computer-readable medium comprising code for causing a computer to:

verify that an access terminal is authorized to access local services;

send to the access terminal a list that maps packet destinations to different Internet Protocol (IP) interfaces, wherein the different IP interfaces include at least a first IP interface and a second IP interface, wherein the second IP interface is associated with an IP address assigned to the access terminal for accessing the local services on a local network, and wherein the packet destinations in the list are for packets sent from the access terminal;

receive a packet from the access terminal; and determine, based on an IP interface associated with the packet, whether to send the packet via a path to an operator network or a local path.

22. The non-transitory computer-readable medium of claim 21, wherein the non-transitory computer-readable medium further comprises codes for causing the computer to encapsulate the packet in a protocol tunnel for transmission to the operator network when a determination is made to send the packet via the path to the operator network.

23. The non-transitory computer-readable medium of claim 21, wherein the non-transitory computer-readable medium further comprises codes for causing the computer to determine whether a destination of the packet is on the local network when a determination is made to send the packet via the local path.

24. The non-transitory computer-readable medium of claim 23, wherein the non-transitory computer-readable medium further comprises codes for causing the computer to:

send the packet to a node on the local network when the destination is on the local network; and send the packet to a local router for forwarding to the destination when the destination is not on the local network.

* * * * *